US012693446B2

(12) United States Patent
Mori

(10) Patent No.: US 12,693,446 B2
(45) Date of Patent: Jul. 28, 2026

(54) INSPECTION SYSTEM

(71) Applicant: KABUSHIKI KAISHA TOSHIBA, Tokyo (JP)

(72) Inventor: Hiroki Mori, Kawasaki Kanagawa (JP)

(73) Assignee: KABUSHIKI KAISHA TOSHIBA, Kawasaki (JP)

(*) Notice: Subject to any disclaimer, the term of this patent is extended or adjusted under 35 U.S.C. 154(b) by 654 days.

(21) Appl. No.: 18/184,357

(22) Filed: Mar. 15, 2023

(65) Prior Publication Data

US 2023/0350093 A1 Nov. 2, 2023

(30) Foreign Application Priority Data

Apr. 28, 2022 (JP) ................................. 2022-074113

(51) Int. Cl.
 *G01V 5/22* (2024.01)
(52) U.S. Cl.
 CPC .................................... *G01V 5/224* (2024.01)
(58) Field of Classification Search
 CPC ........ G01V 5/224; G06V 20/52; G06V 10/82; G06V 40/172; G06V 10/42
 USPC ............................................................ 342/5
 See application file for complete search history.

(56) References Cited

U.S. PATENT DOCUMENTS 6,067,038 A * 5/2000 Uehara ................. G01S 13/931
 342/70
6,970,087 B2 11/2005 Stis

| 7,205,929 | B2 * | 4/2007 | Shingyoji | ............. | G01S 7/4004 |
| | | | | | 342/72 |
| 9,642,014 | B2 * | 5/2017 | Keller | ...................... | G06F 21/56 |
| 10,037,475 | B2 * | 7/2018 | Moshfeghi | ............ | G01S 5/0264 |
| 10,149,169 | B1 * | 12/2018 | Keller | ................... | G06F 21/577 |
| 10,514,455 | B2 * | 12/2019 | Fujioka | ................ | G01S 13/582 |
| 10,616,750 | B2 * | 4/2020 | Thoen | ................... | H04W 48/14 |
| 10,953,831 | B2 * | 3/2021 | Ben Khadhra | ......... | G01S 7/025 |
| 11,006,239 | B2 * | 5/2021 | Taniguchi | ........... | G01S 5/02213 |
| 11,032,788 | B1 * | 6/2021 | Noonan | ................ | H04W 64/00 |
| 11,575,452 | B2 * | 2/2023 | Merlin | ................. | H04B 17/318 |

(Continued)

FOREIGN PATENT DOCUMENTS

| CN | 108732640 A | * | 11/2018 | ............. | G01S 17/90 |
| JP | H117564 A | | 1/1999 | | |

(Continued)

OTHER PUBLICATIONS

Japanese Office Action (and an English language translation thereof) dated Aug. 19, 2025, issued in counterpart Japanese Application No. 2022-074113.

(Continued)

*Primary Examiner* — Nuzhat Pervin
(74) *Attorney, Agent, or Firm* — Holtz, Holtz & Volek PC

(57) ABSTRACT

According to one embodiment, an inspection system includes a first circuitry estimating whether an inspection target possesses a predetermined object, an antenna receiving a first electromagnetic wave, a second circuitry determining whether an electronic device is present in a predetermined range based on the first electromagnetic wave, and a third circuitry determining whether the inspection target possesses the predetermined object based on an estimation result of the first circuitry and a determination result of the second circuitry.

16 Claims, 14 Drawing Sheets

(56) References Cited

U.S. PATENT DOCUMENTS

| | | | | |
|---|---|---|---|---|
| 11,755,886 B2* | 9/2023 | Merlin | | G01S 7/417 |
| | | | | 455/456.1 |
| 11,815,648 B2* | 11/2023 | Obata | | G01V 8/005 |
| 12,013,455 B2* | 6/2024 | Hur | | G01S 7/35 |
| 2003/0142006 A1* | 7/2003 | Walton | | G01S 7/352 |
| | | | | 342/194 |
| 2004/0113781 A1 | 6/2004 | Stis | | |
| 2009/0195435 A1* | 8/2009 | Kapilevich | | G01S 7/032 |
| | | | | 342/202 |
| 2012/0268308 A1* | 10/2012 | Tuttle | | G01S 13/582 |
| | | | | 342/104 |
| 2014/0063197 A1 | 3/2014 | Yamamoto et al. | | |
| 2014/0333466 A1 | 11/2014 | Mohamadi | | |
| 2015/0358337 A1* | 12/2015 | Keller | | H04W 12/128 |
| | | | | 726/23 |
| 2016/0029114 A1 | 1/2016 | Chen | | |
| 2016/0291148 A1 | 10/2016 | Ellenbogen et al. | | |
| 2019/0235042 A1 | 8/2019 | Allnutt et al. | | |
| 2019/0277999 A1* | 9/2019 | Chen | | G01S 13/887 |
| 2019/0281577 A1* | 9/2019 | Taniguchi | | G01S 5/02213 |
| 2019/0331790 A1* | 10/2019 | Ben Khadhra | | G01S 7/025 |
| 2020/0393594 A1* | 12/2020 | Obata | | G06V 40/10 |
| 2021/0055385 A1* | 2/2021 | Rimini | | G01S 7/411 |
| 2021/0063536 A1 | 3/2021 | Harmer et al. | | |
| 2021/0287468 A1* | 9/2021 | Vilhelmsen | | G01S 13/89 |
| 2021/0293988 A1 | 9/2021 | Manneschi | | |
| 2022/0291338 A1* | 9/2022 | Hur | | G01S 7/35 |
| 2022/0413094 A1* | 12/2022 | Hur | | G01S 7/35 |
| 2023/0003884 A1* | 1/2023 | Nomura | | G06T 7/73 |
| 2023/0112537 A1* | 4/2023 | Sakamoto | | A61B 5/024 |
| | | | | 342/22 |
| 2023/0196768 A1* | 6/2023 | Choi | | G06F 1/3278 |
| | | | | 715/740 |
| 2024/0310478 A1* | 9/2024 | Sahara | | G01S 13/343 |
| 2024/0331129 A1* | 10/2024 | Shirakata | | G06T 7/0004 |
| 2024/0333325 A1* | 10/2024 | Hur | | G01S 7/358 |
| 2024/0369675 A1* | 11/2024 | Bancelin | | G01S 7/03 |
| 2024/0369677 A1* | 11/2024 | Bancelin | | G01S 7/027 |

FOREIGN PATENT DOCUMENTS

| | | |
|---|---|---|
| JP | 2012257107 A | 12/2012 |
| JP | 2017514109 A | 6/2017 |
| JP | 2017537399 A | 12/2017 |
| JP | 2018156586 A | 10/2018 |
| JP | 2020204513 A | 12/2020 |
| JP | 2021106330 A | 7/2021 |
| JP | 2022503479 A | 1/2022 |
| JP | 2022509370 A | 1/2022 |
| WO | 2012140587 A2 | 10/2012 |
| WO | 2015134802 A1 | 9/2015 |
| WO | 2016086135 A2 | 6/2016 |
| WO | 2020087019 A1 | 4/2020 |

OTHER PUBLICATIONS

Aki, "Wireless LAN: Communication before connecting to wireless LAN", 2012; Accessed at https://www.itbook.info/network/wlc1.html.

* cited by examiner

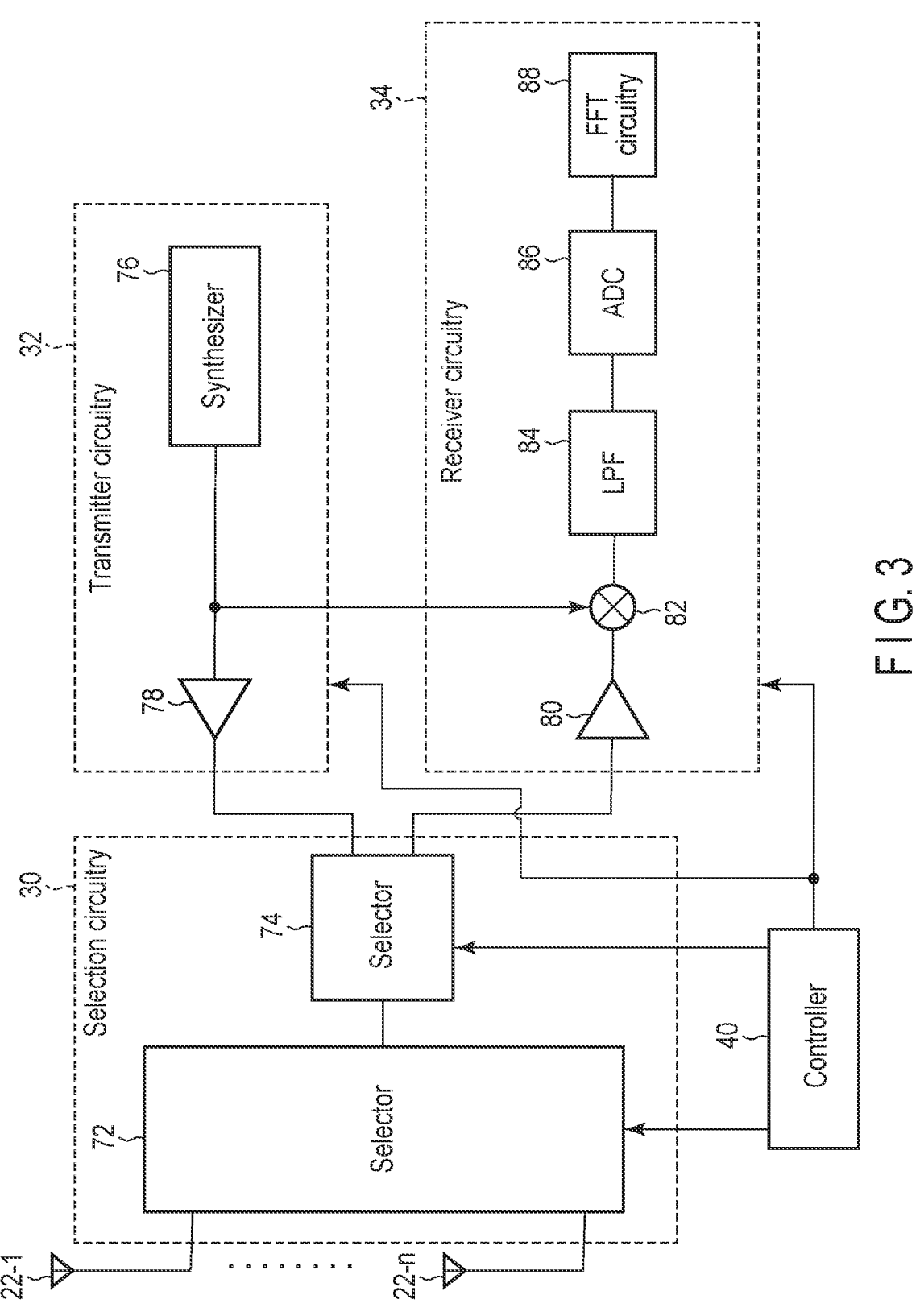
F I G. 3

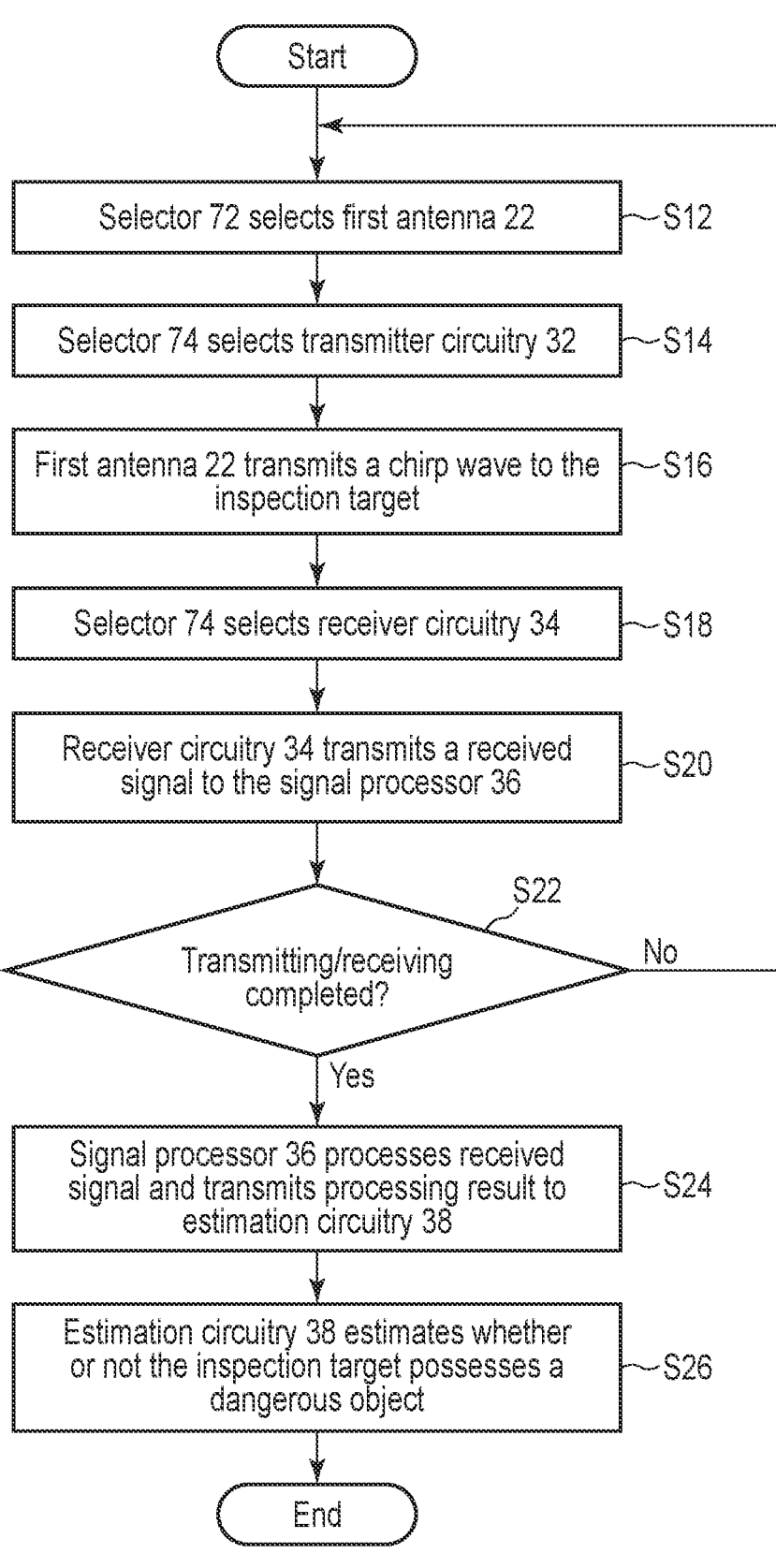
F I G. 6

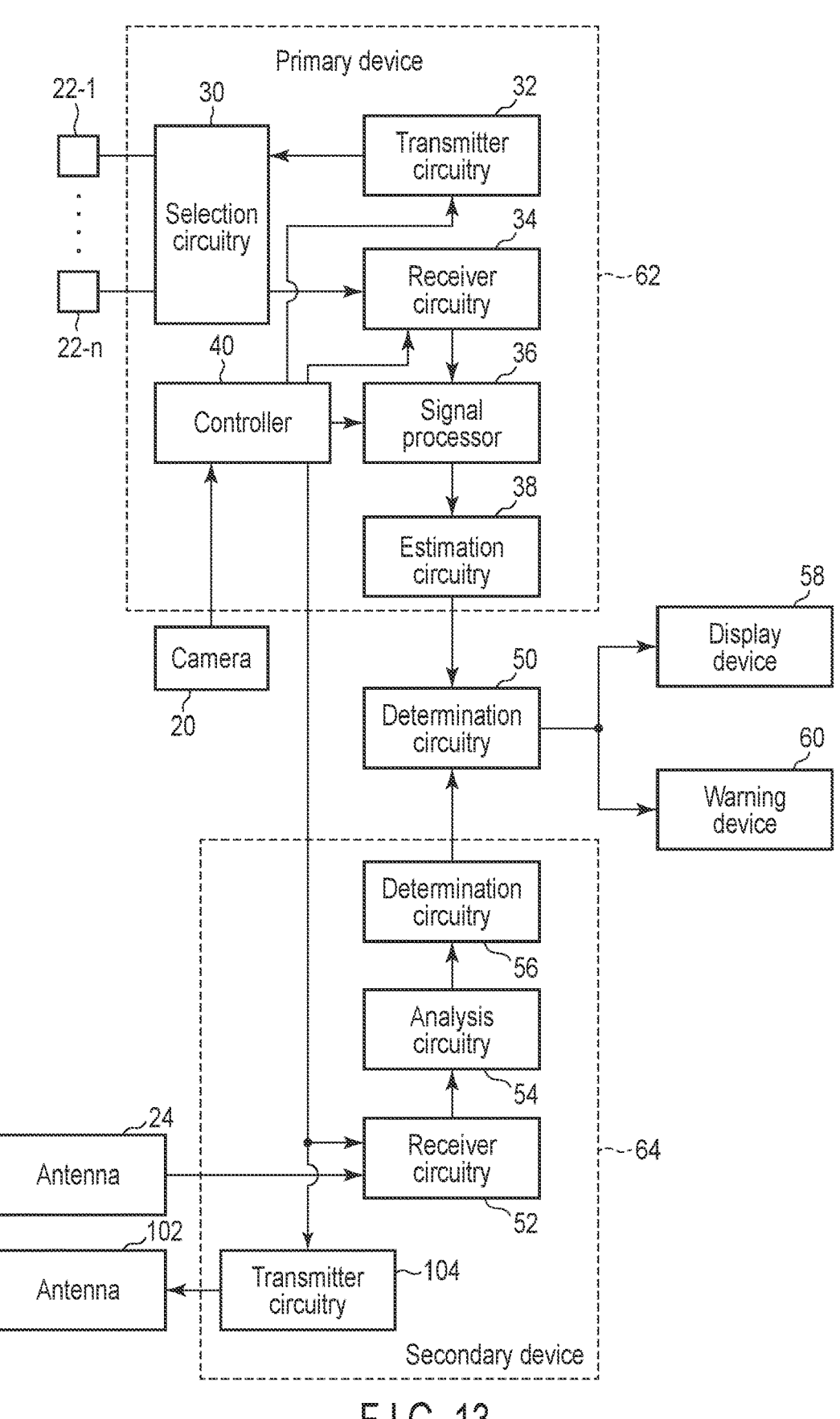
F I G. 13

Advertisement

| Value | Mode |
|-------|------|
| 00b | Non-scannable |
| 01b | Non-scannable |
| 10b | Scannable |
| 11b | Reserved |

FIG. 16

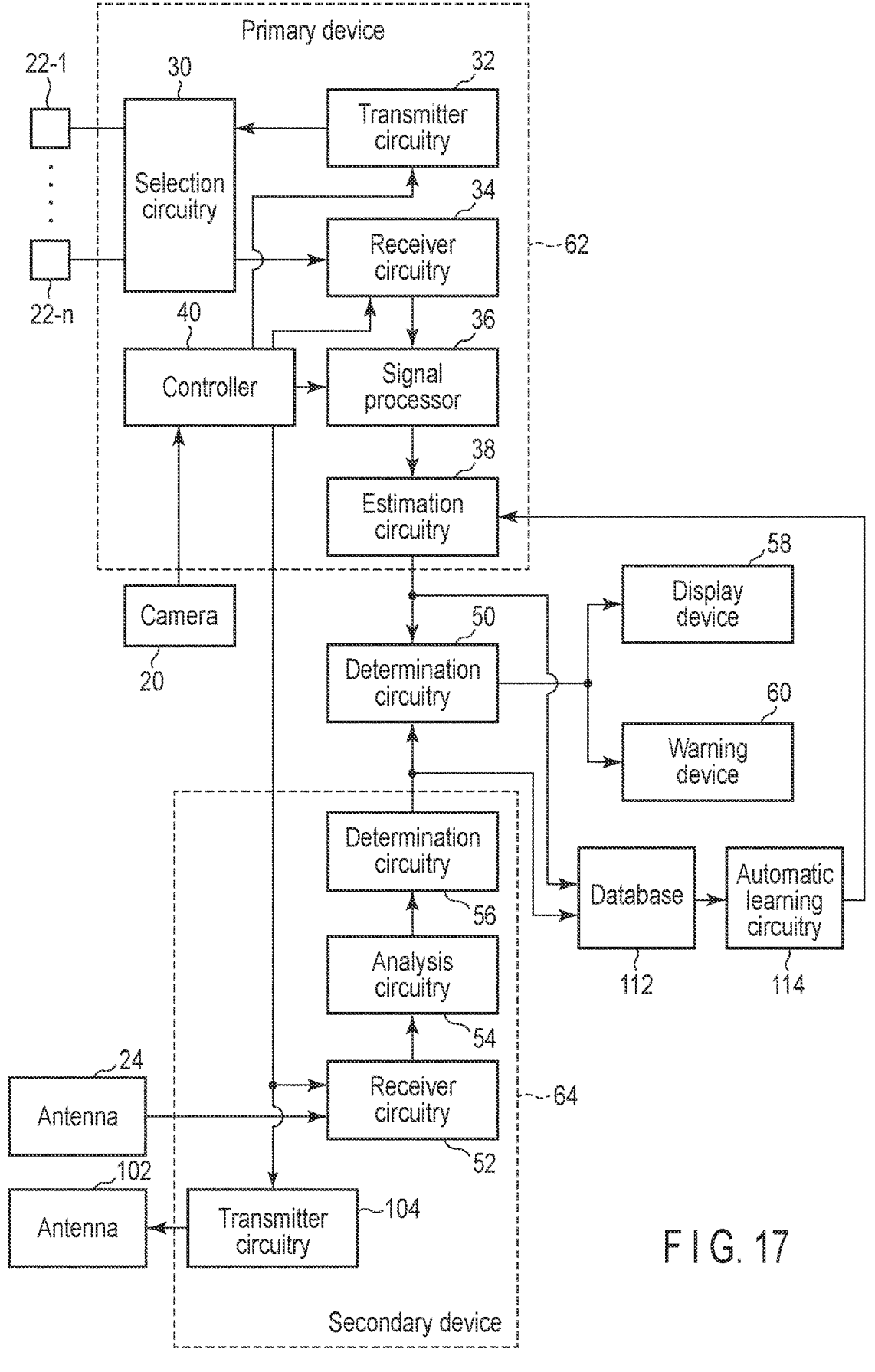
F I G. 17

INSPECTION SYSTEM

CROSS-REFERENCE TO RELATED APPLICATIONS

This application is based upon and claims the benefit of priority from Japanese Patent Application No. 2022-074113, filed Apr. 28, 2022, the entire contents of which are incorporated herein by reference.

FIELD

Embodiments described herein relate generally to an inspection system which inspects belongings of an inspection target.

BACKGROUND

An example of such an inspection system uses a radar. The inspection system transmits an electromagnetic wave to an inspection target and receives a reflected electromagnetic wave. The inspection system may detect an intensity of the reflected electromagnetic wave. The inspection system may determine whether or not the inspection target possesses a dangerous object such as metal or explosives based on the intensity of the reflected electromagnetic wave. The inspection system may generate an image based on the intensity of the reflected electromagnetic wave. The inspection system or an operator may determine whether or not the inspection target possesses a dangerous object such as a knife based on the shape of the object shown in an image. During the transmission of the electromagnetic wave, the inspection target does not need to stand still and may walk. Thus, this inspection system is efficient in inspection.

However, regarding the determination based on the intensity of the reflected electromagnetic wave or the shape of the image, the inspection system may erroneously determine an electronic device such as a smartphone as a dangerous object. To prevent erroneous determination, the inspection target needs to take out an electronic device from a bag or pocket and leave the electronic device with the operator. The inspection target temporarily stops walking at the time of the inspection. Thus, the inspection efficiency is decreased.

BRIEF DESCRIPTION OF THE DRAWINGS

FIG. 3 is a block diagram showing an example of a transmitter circuitry, a receiver circuitry, and a selection circuitry according to the first embodiment.

FIG. 6 is a flowchart showing an example of a flow of an operation of the primary device according to the first embodiment.

FIG. 13 is a block diagram for explaining an example of an inspection system according to a fourth embodiment.

FIG. 16 shows an example of a mode included in an advertisement signal according to the fourth embodiment.

FIG. 17 is a block diagram showing an example of an inspection system according to a fifth embodiment.

DETAILED DESCRIPTION

Figure 1:
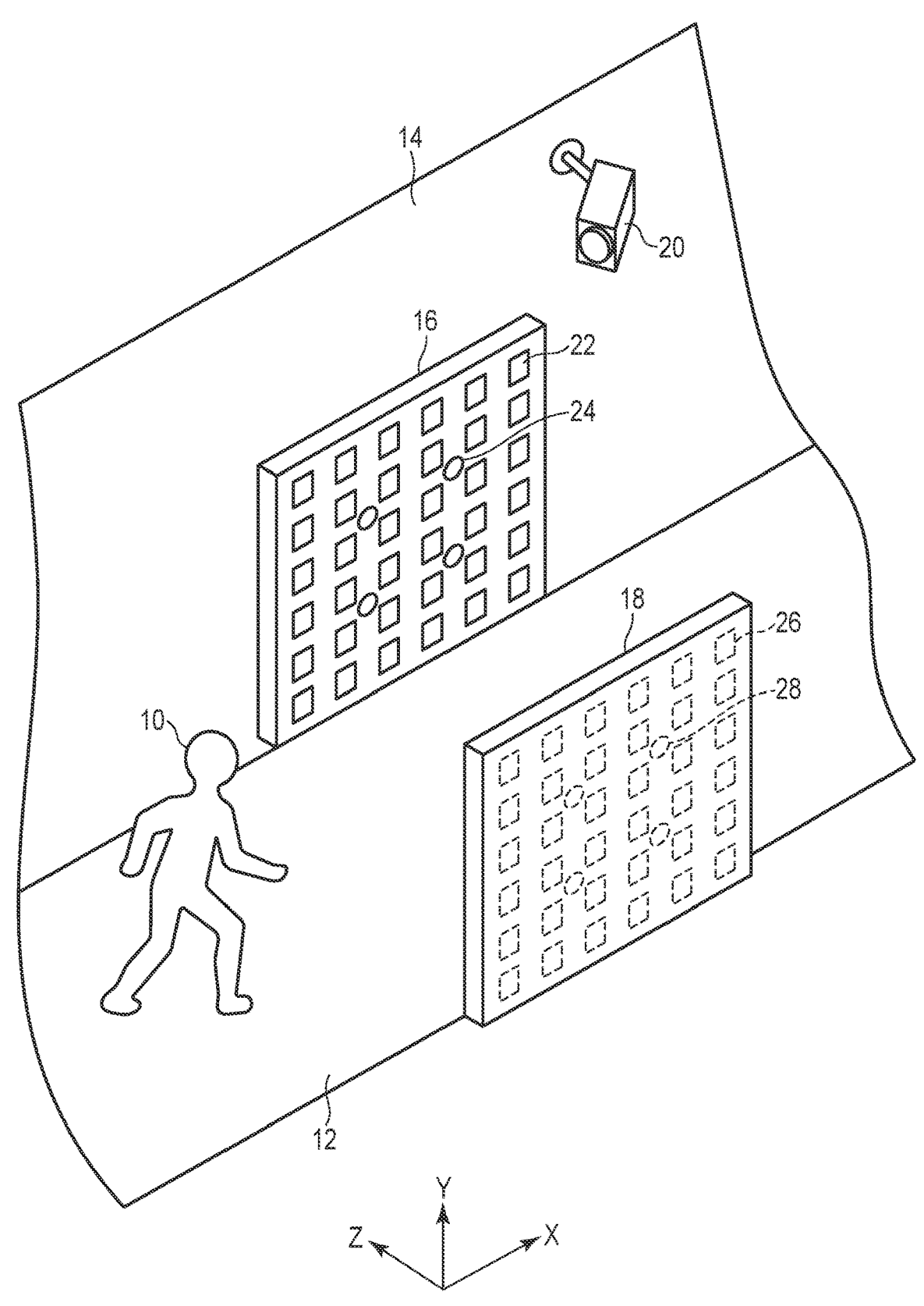
FIG. 1 is a diagram for explaining an example of an inspection system according to a first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an inspection system comprising:

a first circuitry configured to estimate whether an inspection target possesses a predetermined object;

an antenna device configured to receive a first electromagnetic wave;

a second circuitry configured to determine whether an electronic device is present in a predetermined range based on the first electromagnetic wave received by the antenna device; and a third circuitry configured to determine whether the inspection target possesses the predetermined object based on an estimation result of the first circuitry and a determination result of the second circuitry.

First Embodiment

FIG. 1 is a diagram for explaining an example of an inspection system according to a first embodiment. The inspection system relates to a security system provided in a facility where a large number of people gather such as a station, a bus terminal, an airport, a shopping mall, a concert hall, and an exhibition hall. The inspection system according to the embodiment inspects the belongings of walking people and can also inspect the belongings of people who stand still.

An antenna panel 16 and a camera 20 are provided at a side wall 14 of a passage 12. The passage 12 includes a ticket gate of a station, an entering/leaving management gate of a room, etc. The passage 12 may be an area through which a large number of people can pass or an area in which a large number of people can stay. At the other side wall of the passage 12, an antenna panel 18 is provided. The longitudinal direction of the passage 12 is referred to as an X direction. The height direction of the passage 12 is referred to as a Y direction. The width direction of the passage 12 is referred to as a Z direction.

The antenna panels 16 and 18 are parallel to each other. The electromagnetic wave transmitting/receiving area of the antenna panels 16 and 18 is referred to as an inspection area. The provision of two antenna panels 16 and 18 is not mandatory. Only one antenna panel 16 or 18 may be provided.

An imaging range of the camera 20 is the inspection area. The inspection system detects the entry of the inspection target 10 to the inspection area based on the image captured by the camera 20. Instead of the camera 20, an optical sensor which detects the inspection target 10 may be used. Alternatively, the entry of the inspection target 10 to the inspection area may be detected by the transmitting and receiving of an electromagnetic wave by the antenna panels 16 and 18.

The antenna panel 16 includes a substrate, a plurality of first antennas 22 and a plurality of second antennas 24. The number of second antennas 24 may be equal to the number of first antennas 22. In the example of FIG. 1, the number of second antennas 24 is less than the number of first antennas 22.

The first antennas 22 are provided in a two-dimensional array in the substrate of the antenna panel 16 so as to transmit a first electromagnetic wave to the inspection area and receive the reflected electromagnetic wave from the inspection target 10 who is present in the inspection area. The number of first antennas 22 is determined such that the electromagnetic wave transmitting/receiving range of the first antennas 22 includes the inspection area.

If the electromagnetic wave transmitting/receiving range of a single first antenna 22 includes the inspection area, only one first antenna 22 may be used instead of using a plurality of first antennas 22. Instead of using a plurality of first antennas 22, only one first antenna 22 may be used if the transmitting/receiving direction of the electromagnetic wave of the first antenna 22 is mechanically or electronically variable in a two-dimensional manner. Instead of using the first antennas 22 provided in a two-dimensional array, first antennas 22 provided in a line in a one-dimensional array may be used if the transmitting/receiving direction of the electromagnetic wave of these first antennas 22 is mechanically or electronically variable in a one-dimensional manner.

The first antennas 22 are arranged at an equal antenna interval. For the interval, an arbitrary interval can be selected. For example, the interval is approximately half the wavelength λ (approximately half wavelength) having the greatest intensity in a wavelength range of the first electromagnetic wave transmitted from the first antennas 22. It should be noted that the approximately half wavelength includes, for example, an error up to ±30% of the half wavelength λ/2.

For the first electromagnetic wave, an arbitrary electromagnetic wave can be selected. For example, the first electromagnetic wave may include an electromagnetic wave having a wavelength of 1 centimeter to 1 millimeter (with a frequency of 30 GHz to 300 GHz), which is also referred to as a millimeter wave. The first electromagnetic wave may include an electromagnetic wave having a wavelength of 1 millimeter to 100 micrometers (with a frequency of 300 GHz to 3 THz), which is also referred to as a submillimeter or terahertz wave.

When the first electromagnetic wave is transmitted to the inspection target 10, the first electromagnetic wave is reflected on an object which is present on the propagation path of the first electromagnetic wave. By measuring the reflection intensity of the first electromagnetic wave reflected at a certain distance, it is possible to determine whether the object which is present at the distance is a human body or a predetermined object, and thus, it is possible to determine whether or not the inspection target 10 possesses a predetermined object. The predetermined object is a dangerous object which is not allowed to be possessed in the installation site of the inspection system. An example of the dangerous object is a metal object such as a gun and a knife, powder such as an explosive and liquid such as gasoline. An example of the dangerous object may be an unauthorized carry-on object such as power of narcotics, etc., and a gold bar.

The second antennas 24 can receive a second electromagnetic wave. For the second electromagnetic wave, an arbitrary electromagnetic wave can be selected. For example, the second electromagnetic wave may include an electromagnetic having a wavelength of 10 centimeters to 1 centimeter (with a frequency of 3 GHz to 30 GHz), which is also referred to as a microwave. Another example of the frequency of the second electromagnetic wave is 920 MHz. Yet other examples of the second electromagnetic wave are a millimeter wave and a submillimeter wave.

The frequency of the second electromagnetic wave should be different from that of the first electromagnetic wave. Thus, when part of microwaves is not used as the second electromagnetic wave, the microwaves which are not used as the second electromagnetic wave may be used as the first electromagnetic wave.

The inspection system should be able to at least distinguish the second electromagnetic wave from the first electromagnetic wave. Thus, the frequency of the second electromagnetic wave may be the same as that of the first electromagnetic wave. The second and first electromagnetic waves having the same frequency can be distinguished from each other by differentiating the second electromagnetic wave from the first electromagnetic wave in terms of, for example, the modulation method, the direction of linearly polarized wave, and the rotation direction of circularly polarized wave.

The second antennas 24 are provided in a two-dimensional array in the substrate of the antenna panel 16 so as to receive the second electromagnetic wave transmitted from the inspection area. The number of second antennas 24 is determined such that the electromagnetic wave receiving range of the second antennas 24 includes the inspection area.

If the electromagnetic wave receiving range of a single second antenna 24 includes the inspection area, only one second antenna 24 may be used instead of using a plurality of second antennas 24. Instead of using a plurality of second antennas 24, only one second antenna 24 may be used if the receiving direction of the electromagnetic wave of the second antenna 24 is mechanically or electronically variable in a two-dimensional manner. Instead of using the second antennas 24 provided in a two-dimensional array, second antennas 24 provided in a line in a one-dimensional array may be used if the receiving direction of the electromagnetic wave of the second antennas 24 is mechanically or electronically variable in a one-dimensional manner.

It is possible to determine whether or not an electronic device which transmits the second electromagnetic wave is present in the inspection area by analyzing the received signal of the second electromagnetic wave received by the second antennas 24.

The antenna panel 18 is formed in the same manner as the antenna panel 16. The antenna panel 18 includes a substrate, a plurality of first antennas 26, and a plurality of second antennas 28. The first antennas 26 correspond to the first antennas 22 of the antenna panel 16. The second antennas 28 correspond to the second antennas 24 of the antenna panel 16.

The first antennas 22 or 26 may not be provided in the same antenna panel substrate as the second antennas 24 or 28 and may be provided in a substrate different from that of the second antennas 24 or 28.

Figure 2:
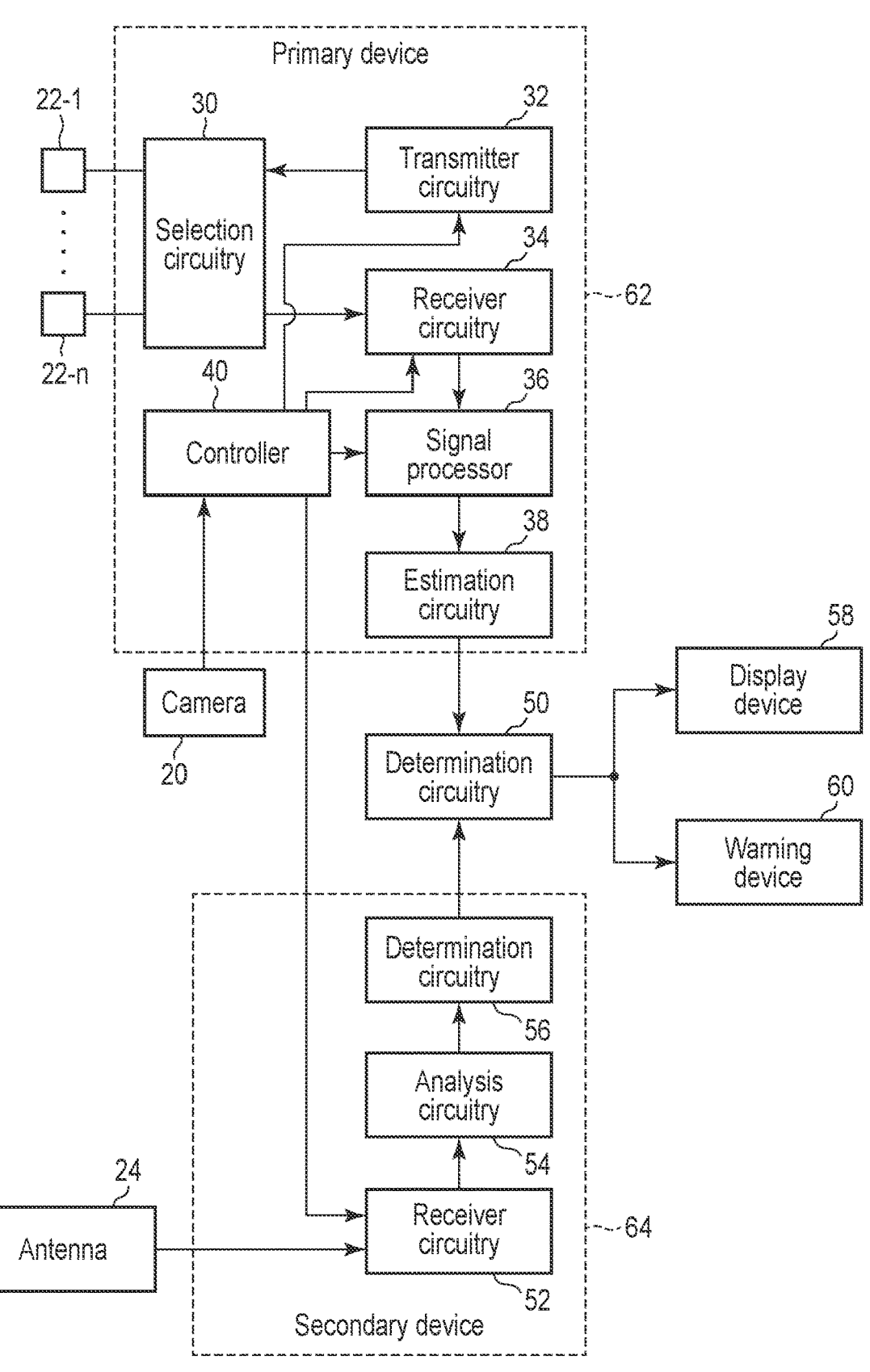
FIG. 2 is a block diagram showing an example of the inspection system according to the first embodiment.

FIG. 2 is a block diagram showing an example of an electric circuitry of the inspection system according to the first embodiment. The inspection system includes a primary device 62, a secondary device 64, a determination circuitry 50, a display device 58, and a warning device 60.

The secondary device 64 is a passive device which processes the received signal of the second electromagnetic wave received by the second antennas 24 or 28. The secondary device 64 does not include a function of transmitting the second electromagnetic wave. An electronic device which is present in the inspection area transmits the second electromagnetic wave. The secondary device 64 determines whether or not an electronic device is present in a predetermined range. For example, the predetermined range is the inspection area.

An example of the electronic device is a device with a communication function. An example of the electronic device is a personal computer, a smartphone, a mobile phone, a mobile game console, a wristwatch comprising a built-in sensor, clothes comprising a built-in sensor, or shoes comprising a built-in sensor. These wristwatch, clothes, and shoes include a built-in sensor which measures, for example, the heart rate, the blood pressure, or the number of steps, and a built-in transmitter which transmits the measurement values to a smartphone, etc.

These electronic devices transmit data for data communication to a base station or an access point while they are connected to the Internet. An electronic device with the function of a mobile phone transmits a sound signal to a base station during a call. The secondary device 64 receives the data or sound signal transmitted from electronic devices as the second electromagnetic wave.

Electronic devices may transmit a specific signal while they are not connected to the Internet or they are not on a call.

For example, when the function of a mobile phone is turned on, a telephone device such as a smartphone periodically transmits a channel sounding signal to a base station. The base station needs to evaluate the propagation characteristic for scheduling. The base station uses a channel sounding signal for this evaluation. The secondary device 64 receives the channel sounding signal as the second electromagnetic wave.

When a tethering function is turned on, the electronic device functions as an access point. The electronic device (access point) periodically transmits a beacon signal. The secondary device 64 receives the beacon signal as the second electromagnetic wave.

When the function of Bluetooth Low Energy (BLE) (registered trademark) is turned on, the electronic device functions as a peripheral. The electronic device (peripheral) periodically transmits a beacon signal to start the connection with a central. The secondary device 64 receives the beacon signal as the second electromagnetic wave.

When the function of Ultra Wide Band (UWB) is turned on, the electronic device periodically transmits a device discovery signal for searching for another UWB device. The secondary device 64 receives the device discovery signal as the second electromagnetic wave.

The inspection system determines whether or not an electronic device is present in a predetermined range (inspection area) by receiving the data, the sound signal, or the specific signal as the second electromagnetic wave.

The primary device 62 is an active radar device which transmits the first electromagnetic wave to each point of the inspection target 10, processes the received signal of the reflected electromagnetic wave of each point, and determines what the reflective object is. The primary device 62 estimates whether or not the inspection target 10 possesses a dangerous object.

FIG. 2 shows the primary device 62 and the secondary device 64 connected to the antenna panel 16. The primary device 62 is connected to the first antennas 22 and the camera 20. The secondary device 64 is connected to the second antennas 24.

The primary device 62 includes a selection circuitry 30, a transmitter circuitry 32, a receiver circuitry 34, a signal processor 36, an estimation circuitry 38, and a controller 40. The selection circuitry 30 is connected to the first antennas 22-1 to 22-$n$, where n is an arbitrary positive integer. The transmitter circuitry 32 and the receiver circuitry 34 are connected to the selection circuitry 30. The receiver circuitry 34 outputs the received signal of each point of the inspection target 10. The received signals output from the receiver circuitry 34 are transmitted to the signal processor 36. The signal processor 36 accumulates the received signals and transmits a processing result indicating the reflection property of each point of the inspection target 10 to the estimation circuitry 38. The reflection property is the reflection intensity or the amount of the Doppler shift. The amount of the Doppler shift is the amount of the frequency shift generated in relation to the movement of the inspection target 10.

The estimation circuitry 38 estimates whether or not the inspection target 10 possesses a dangerous object based on the processing result and transmits an estimation result to the determination circuitry 50.

For example, the estimation circuitry 38 is a convolutional neural network. The convolutional neural network includes an input layer, a pooling layer, a fully-connected layer, and an output layer. The convolutional neural network learns the determination results of the possession of dangerous objects by using a large number of image signals as training data. The image signal indicating the reflection property of each point of the inspection target 10 is input to the input layer.

When the image signal includes an object having a shape which can be estimated as a dangerous object, the estimation circuitry 38 estimates that the inspection target 10 possesses a dangerous object. When the image does not include an object having a shape which can be estimated as a dangerous object, the estimation circuitry 38 estimates that the inspection target 10 does not possess any dangerous object.

The output signal of the camera 20 is input to the controller 40. The controller 40 transmits a control signal to the transmitter circuitry 32, the receiver circuitry 34, and the signal processor 36 based on the image captured by the camera 20 for the inspection area and controls the operation timing of the transmitter circuitry 32, the receiver circuitry 34, and the signal processor 36.

The secondary device 64 includes a receiver circuitry 52, an analysis circuitry 54, and a determination circuitry 56. The receiver circuitry 52 is connected to the second antennas 24. The received signal output from the receiver circuitry 52 is transmitted to the analysis circuitry 54. The analysis circuitry 54 analyzes the received signal and transmits an analysis result signal indicating the property of the second electromagnetic wave to the determination circuitry 56. The determination circuitry 56 determines whether or not an electronic device which transmitted the second electromagnetic wave is present in a predetermined range (inspection area) based on the analysis result signal and transmits the determination result to the determination circuitry 50.

The controller 40 transmits the control signal to the receiver circuitry 52 based on the image captured by the camera 20 for the inspection area and controls the operation timing of the receiver circuitry 52.

The determination circuitry 50 determines whether or not the inspection target 10 possesses a dangerous object based on the estimation result of the estimation circuitry 38 and the determination result of the determination circuitry 56. There is a possibility that the estimation circuitry 38 erroneously estimates an electronic device as a dangerous object. The determination circuitry 50 eliminates the effect caused by erroneously estimating an electronic device as a dangerous object from the estimation result of the estimation circuitry 38 based on the determination result of the determination circuitry 56 and determines whether or not the inspection target 10 possesses a dangerous object which is not an electronic device.

The determination circuitry 50 transmits the determination result to an output device. An example of the output device is the display device 58 and the warning device 60. The display device 58 and the warning device 60 notify the operator of the inspection system that the inspection target 10 possesses a dangerous object or the inspection target 10 does not possess any dangerous object.

A primary device and a secondary device similar to the primary device 62 and the secondary device 64 are connected to the antenna panel 18. The output of the primary device and the secondary device connected to the antenna panel 18 is supplied to a determination circuitry similar to the determination circuitry 50. The display device 58 and the warning device 60 may be common to the antenna panels 16 and 18 or may be provided individually for the antenna panels 16 and 18.

The signal processor 36, the estimation circuitry 38, the controller 40, the determination circuitry 50, the analysis circuitry 54, and the determination circuitry 56 may be formed of hardware, or may be formed of a computer which functions as the signal processor 36, the estimation circuitry 38, the controller 40, the determination circuitry 50, the analysis circuitry 54, and the determination circuitry 56 by executing software. The signal processor 36, the estimation circuitry 38, the controller 40, the determination circuitry 50, the analysis circuitry 54, and the determination circuitry 56 may be formed of a cloud system.

FIG. 3 is a block diagram showing an example of the electric configuration of the transmitter circuitry 32, the receiver circuitry 34, and the selection circuitry 30 of the primary device 62 of the inspection system according to the first embodiment.

The selection circuitry 30 includes a selector 72 and a selector 74. The selector 72 and the selector 74 switches the connection based on the control signal from the controller 40.

The selector 74 is connected to one of the first antennas 22-1 to 22-$n$ through the selector 72. The selector 72 selects the connection destination from the first antennas 22-1 to 22-$n$ based on the control signal from the controller 40.

The selector 74 is connected to the selector 72, the transmitter circuitry 32, and the receiver circuitry 34. The selector 74 connects the transmitter circuitry 32 or the receiver circuitry 34 to the selector 74. The selector 74 switches the connection destination between the transmitter circuitry 32 and the receiver circuitry 34 based on the control signal from the controller 40.

The transmitter circuitry 32 includes a synthesizer 76 and a transmit amplifier 78.

The primary device 62 includes a radar function in a linear frequency modulated continuous wave (L-FMCW) system in which the frequency linearly increases as time passes. The synthesizer 76 generates the L-FMCW signal (hereinafter, referred to as a chirp signal).

The chirp signal output from the synthesizer 76 is transmitted to one of the first antennas 22-1 to 22-$n$ via the transmit amplifier 78, the selector 74, and the selector 72. When the controller 40 detects the entry of the inspection target 10 to the area between the antenna panels 16 and 18, one of the first antennas 22-1 to 22-$n$ transmits the chirp signal to the inspection target 10.

The transmitted chirp wave is reflected on an object which is present on the propagation path. The chirp signal received by one of the first antennas 22-1 to 22-$n$ is transmitted to the receiver circuitry 34 via the selectors 72 and 74.

The receiver circuitry 34 includes a receive amplifier 80, a mixer 82, a low-pass filter (LPF) 84, an A/D converter (ADC) 86, and a fast Fourier transform circuitry (FFT) 88.

The output signal of the selector 74 is supplied to the receive amplifier 80. The received signal output from the receive amplifier 80 is input to a first input terminal of the mixer 82. The chirp signal generated by the synthesizer 76 is input to a second input terminal of the mixer 82. The mixer 82 multiplies the received signal by the chirp signal and generates an intermediate frequency (IF) signal.

The IF signal output from the mixer 82 is supplied to the FFT circuitry 88 via the LPF 84 and the ADC 86. The FFT circuitry 88 obtains the intensity of the electromagnetic wave received by the first antennas 22-1 to 22-$n$.

The controller 40 also generates a clock signal and supplies the clock signal to the transmitter circuitry 32 and the receiver circuitry 34. The operation timings of the transmitter circuitry 32 and the receiver circuitry 34 are controlled by the clock signal.

In the example of FIG. 3, a single transmitter circuitry 32 and a single receiver circuitry 34 are provided for a plurality of the first antennas 22. However, a plurality of the transmitter circuitries 32 and a plurality of the receiver circuitries 34 may be provided for a plurality of the first antennas 22. In this case, neither the selector 72 nor 74 is needed.

Figures 4A, 4B:
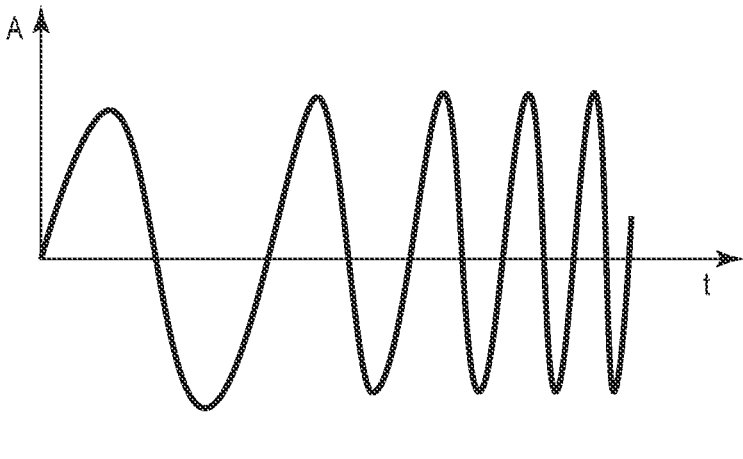
FIG. 4A shows an example of a chirp signal according to the first embodiment.
FIG. 4B shows another example of the chirp signal according to the first embodiment.

FIGS. 4A and 4B show an example of the chirp signal transmitted from the primary device 62 according to the first embodiment. FIG. 4A shows an example of the chirp signal indicating an amplitude A as a function of time t. FIG. 4B shows another example of the chirp signal indicating a frequency f as the function of time t. As shown in FIG. 4B, the chirp signal is represented by a center frequency fc, a modulation bandwidth fb, and a signal time width Tb. An inclination of the chirp signal is referred to as a change rate (chirp rate) γ of the frequency.

The transmitted signal St(t) of the chirp signal is shown by equation 1.

$$St(t)=\cos[2\pi(fc{\times}t+\gamma t^2/2)] \qquad \text{Equation 1}$$

The chirp rate γ is shown by equation 2.

$$\gamma=fb/Tb \qquad \text{Equation 2}$$

The reflected electromagnetic wave from an object which is a distant R distant from the antenna panel 16 is observed Δt=2R/c after the transmitting time point, where c is the speed of light. The received signal Sr(t) is shown by equation 3 when the reflection intensity of the object is a.

$$Sr(t)=a{\times}\cos[2\pi fc(t-\Delta t)+\pi\gamma(t-\Delta t)^2] \qquad \text{Equation 3}$$

Figures 5A, 5B, 5C:
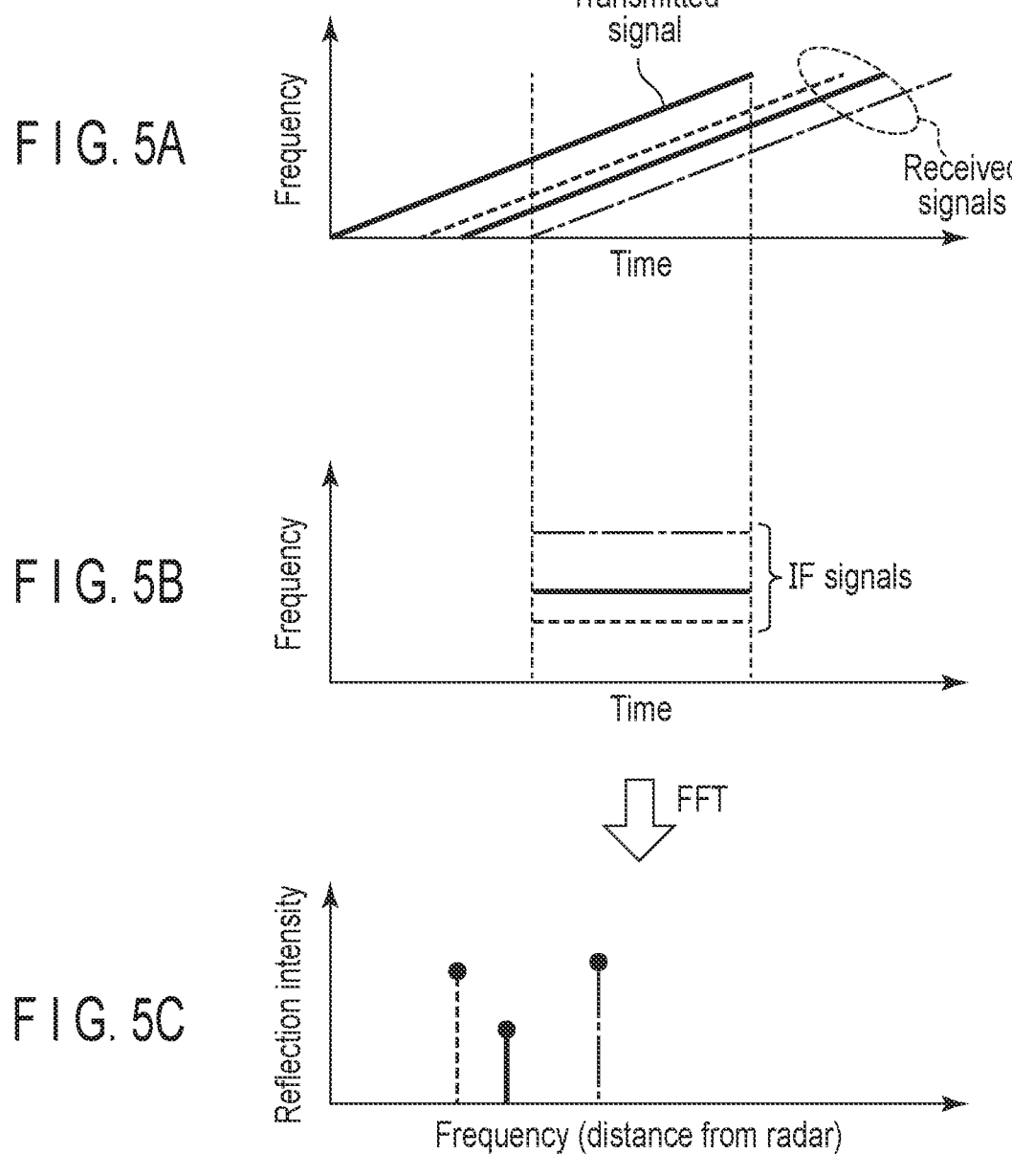
FIG. 5A shows a diagram for explaining an example of an operation of a primary device according to the first embodiment.
FIG. 5B shows a diagram for explaining the example of the operation of the primary device according to the first embodiment.
FIG. 5C shows a diagram for explaining the example of the operation of the primary device according to the first embodiment.

FIGS. 5A, 5B, and 5C show diagrams for explaining an example of the operation of the primary device 62 according to the first embodiment. FIGS. 5A, 5B, and 5C show the detection principle of a plurality of, for example, three objects. FIG. 5A shows the relationship between a transmitted signal and time and the relationship between a received signal and time. As shown in FIG. 5A, the frequency of the transmitted signal linearly changes as time passes. The received signal is delayed for Δt relative to the transmitted signal. When a plurality of objects are present, the reflected electromagnetic wave from the closest object shown by a broken line is received firstly, and the reflected electromagnetic wave from the farthest object shown by an alternate long and short dash line is received lastly.

As shown in FIG. 3, the received signal is multiplied by the chirp signal by the mixer 82 to be an IF signal z(t). The IF signal z(t) is shown by equation 4.

$$z(t)=a{\times}\cos(2\pi\Delta t\gamma t) \qquad \text{Equation 4}$$

FIG. 5B shows the relationship between the frequency and time regarding an IF signal. In an ideal environment without any noise, etc., the frequency is constant for each reflected electromagnetic wave. The frequency of the IF signal of the reflected electromagnetic wave from the closest object shown by the broken line is the lowest. The frequency of the IF signal of the reflected electromagnetic wave from the farthest object shown by the alternate long and short dash line is the highest.

The reflection intensity of the frequency domain can be calculated by applying FFT to the IF signal of the time domain shown in equation 4 in the FFT circuitry 88. Thus, the amplitude at each point of the frequency domain as the result of the FFT of the IF signal corresponds to the reflection intensity for each distance from the antenna panel 16. The relationship between the frequency $f_{if}$ and the distance R is shown by equation 5.

$$f_{if}=\Delta t\gamma=2R\gamma/c \qquad \text{Equation 5}$$

The relationship between the reflection intensity obtained by applying FFT to the IF signal of the time domain and the frequency is shown in FIG. 5C. In this way, the reflection intensity for each distance from the antenna panel 16 can be obtained by obtaining the amplitude of the frequency domain signal of the IF signal.

The electromagnetic wave transmitted from the first antennas 22 is reflected on an object and is also reflected on the skin of the inspection target 10. The reflectance of metal is higher than that of skin. The intensity of the reflected electromagnetic wave of metal is higher than that of the reflected electromagnetic wave of skin. Electromagnetic waves are absorbed in powder such as explosives. The reflectance of powder is lower than that of skin. The intensity of the reflected electromagnetic wave of powder is lower than that of the reflected electromagnetic wave of skin. The intensity of the reflected electromagnetic wave is based on the type of the substance of the point of skin, metal, or powder, etc., on which the electromagnetic wave is reflected. Thus, the signal processor 36 can obtain the type of the substance of a reflection point from the intensity of the reflected electromagnetic wave.

FIG. 6 is a flowchart showing an example of the flow of an operation of the primary device 62 according to the first embodiment. The image captured by the camera 20 is supplied to the controller 40. The controller 40 determines whether or not the inspection target 10 enters the inspection area based on the image captured by the camera 20. When the controller 40 detects the entry of the inspection target 10 to the inspection area, the controller 40 causes the primary device 62 to operate and start the process of FIG. 6.

The selector 72 selects one of the first antennas 22 (S12). For example, the selector 72 selects the first antenna 22-1.

The selector 74 selects the transmitter circuitry 32 (S14). In this way, the transmitter circuitry 32 is connected to the first antenna 22-1 via the selectors 72 and 74.

The chirp signal output from the synthesizer 76 is transmitted to the first antenna 22-1. The first antenna 22-1 transmits the chirp wave to the inspection target 10 (S16).

The selector 74 selects the receiver circuitry 34 (S18). In this way, the first antenna 22-1 is connected to the receiver circuitry 34 via the selectors 72 and 74.

The receiver circuitry 34 transmits a received signal indicating the reflected electromagnetic wave received by the first antenna 22-1 to the signal processor 36 (S20).

The controller 40 determines whether or not all of the first antennas 22 have performed transmitting and receiving (S22). When at least one of the first antennas 22 has not performed transmitting and receiving (S22; No), the controller 40 performs the process from steps S12 to S22 again for one of the first antennas 22 which have not performed transmitting and receiving.

When all of the first antennas 22 have performed transmitting and receiving (S22; Yes), the signal processor 36 processes the received signal and transmits a processing result to the estimation circuitry 38 (S24).

The estimation circuitry 38 estimates whether or not the inspection target 10 possesses a dangerous object based on the processing result transmitted from the signal processor 36 (S26).

The estimation circuitry 38 transmits an estimation result to the determination circuitry 50.

In the operation of FIG. 6, the chirp wave transmitted by a single antenna 22 is received by the same antenna 22. However, the chirp wave transmitted by a single antenna 22 may be received simultaneously in a plurality of the antennas 22 including the transmit antenna. Further, although the chirp wave is transmitted from all of the antennas 22-1 to 22-n, the transmit antennas may be a small number of antennas selected from the antennas 22-1 to 22-n.

Figures 7, 8:
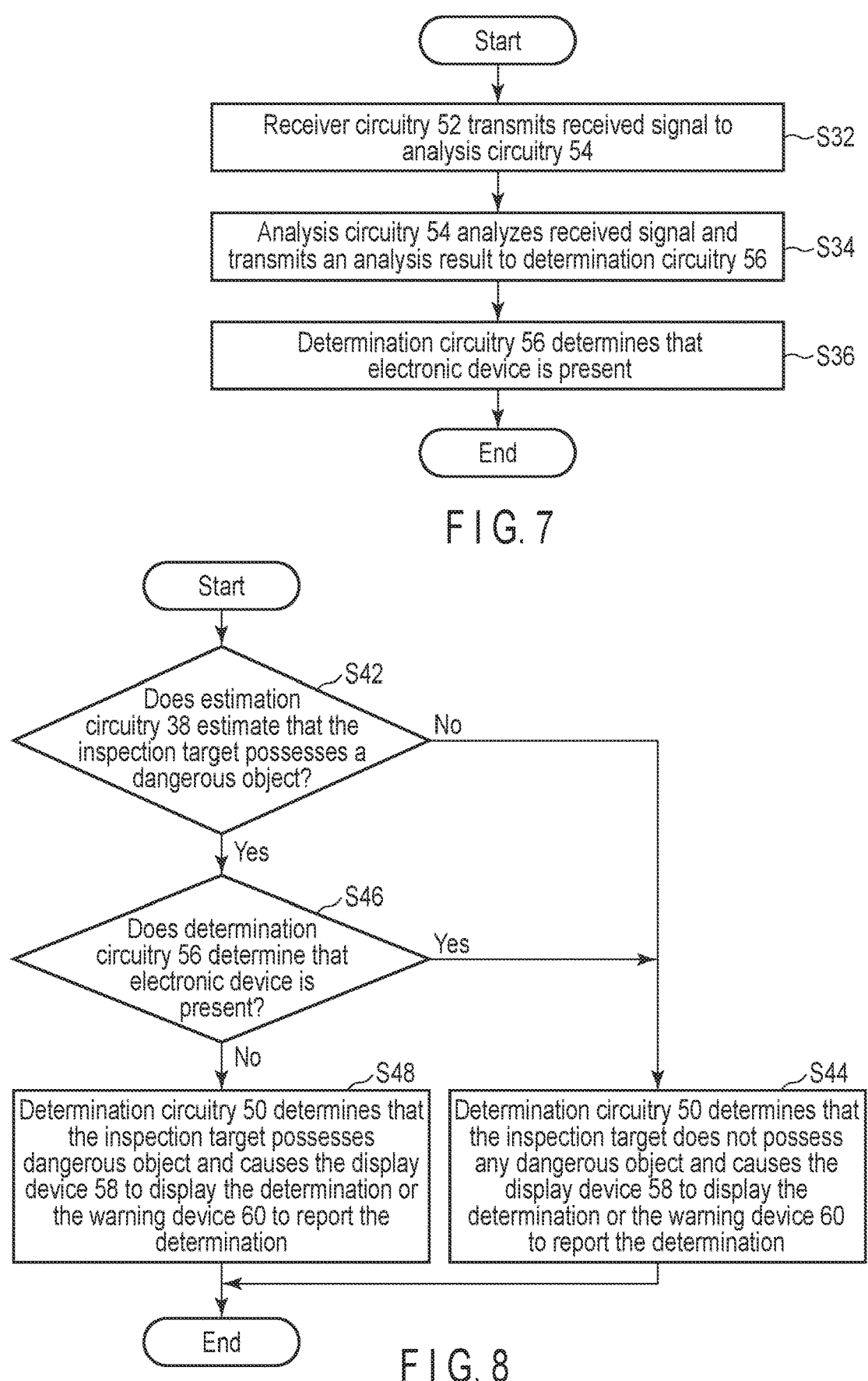
FIG. 7 is a flowchart showing an example of the flow of an operation of a secondary device according to the first embodiment.
FIG. 8 is a flowchart showing an example of the flow of an operation of a determination circuitry according to the first embodiment.

FIG. 7 is a flowchart showing an example of the flow of an operation of the secondary device 64 of the inspection system according to the first embodiment.

The receiver circuitry 52 transmits a received signal corresponding to the reflected electromagnetic wave received by the second antennas 24 to the analysis circuitry 54 (S32).

When the number of second antennas 24 is more than one, and a single receiver circuitry 52 is provided, the received signals of the second antennas 24 are sequentially transmitted to the single receiver circuitry 52 via a selector. When a plurality of receiver circuitries 52 are provided, and the number of the second antennas 24 is equal to the number of the receiver circuitries 52, the received signals of the second antennas 24 are transmitted to the receiver circuitries 52, respectively.

When an electronic device transmits the second electromagnetic wave with a plurality of frequencies, a second antenna 24 which can receive an electromagnetic wave with a wide band may be provided such that the frequency of the received electromagnetic wave is switched in series and the second antenna 24 receives electromagnetic waves with different frequencies in a time-divisional manner. When an electronic device transmits the second electromagnetic wave with a plurality of frequencies, a plurality of second antennas 24 which receive an electromagnetic wave with a plurality of frequencies, respectively, may be provided such that the second antennas 24 simultaneously receive electromagnetic waves with different frequencies.

The analysis circuitry 54 analyzes the received signal and transmits an analysis result to the determination circuitry 56 (S34).

An example of the analysis is a spectrum analysis or a sniffer analysis. An example of the spectrum analysis is a frequency analysis or a time frequency analysis. A frequency analysis result shows the frequency of the received signal. A time frequency analysis result shows the bandwidth, signal occupation rate, and duty ratio of the received signal.

The sniffer analysis is to analyze the data structure of a received signal packet and discover information which can specify an electronic device of the transmitting source of the electromagnetic wave. In the case of BLE communication, an example of the information which can specify an electronic device is a manufacture name or a model number.

The determination circuitry 56 determines that an electronic device is present in the predetermined range or no electronic device is present in the predetermined range based on the analysis result (S36). For example, the predetermined range is the inspection area.

When the determination circuitry 56 determines, based on the frequency analysis result, that the received signal includes a signal with frequencies which could be transmitted from an electronic device and the power of the signal is sufficient, the determination circuitry 56 determines that an electronic device is present in the predetermined range. When the determination circuitry 56 determines, based on the frequency analysis result, that the received signal includes a signal with frequencies which could be transmitted from an electronic device but the power of the signal is insufficient, the determination circuitry 56 determines that no electronic device is present in the predetermined range. When the determination circuitry 56 determines, based on the frequency analysis result, that the received signal does not include a signal with frequencies which could be transmitted from an electronic device, the determination circuitry 56 determines that no electronic device is present in the predetermined range.

When the determination circuitry 56 determines, based on the time frequency analysis result, that at least one of the bandwidth, signal occupation rate, and duty ratio of the received signal is equal to the bandwidth, signal occupation rate, or duty ratio of a signal which could be transmitted from an electronic device, the determination circuitry 56 determines that an electronic device is present in the predetermined range. When the determination circuitry 56, based on the time frequency analysis result, determines that none of the bandwidth, signal occupation rate, and duty ratio of the received signal is equal to the bandwidth, signal occupation rate, or duty ratio of a signal which could be transmitted from an electronic device, the determination circuitry 56 determines that no electronic device is present in the predetermined range.

When the determination circuitry 56 determines, based on the sniffer analysis result, that the received signal packet includes information which specifies an inordinary device, the determination circuitry 56 determines that an electronic device is present in the predetermined range. In some installation environments of the inspection system, even if the inspection target 10 is not located in the inspection area, the secondary device 64 constantly detects the electromagnetic wave transmitted from an access point in Wi-Fi (registered trademark) communication provided by a third party. This type of electronic device, which is constantly detected, is stored as an ordinary device. When the inspection target 10 is located in the inspection area, and the determination circuitry 56 detects an electronic device other than the ordinary device, the determination circuitry 56 determines that the inordinary device is present (an electronic device is present in the predetermined range). When the determination circuitry 56 determines, based on the sniffer analysis result, that the received signal packet does not include information which specifies the type of an electronic device, the determination circuitry 56 determines that no electronic device is present in the predetermined range.

The determination circuitry 56 transmits the determination result to the determination circuitry 50.

FIG. 8 is a flowchart showing an example of the flow of an operation of the determination circuitry 50 of the inspection system according to the first embodiment.

The determination circuitry 50 determines whether or not the estimation result of the estimation circuitry 38 indicates that the inspection target 10 possesses a dangerous object (S42).

When the estimation result of the estimation circuitry 38 indicates that the inspection target 10 does not possess any dangerous object (S42; No), the determination circuitry 50 determines that the inspection target 10 does not possess any dangerous object and causes the display device 58 to display the determination result or causes the warning device 60 to report the determination result (S44).

Due to the operation of S44, the operator of the inspection system recognizes that a secondary inspection is not needed for the inspection target 10.

When the estimation result of the estimation circuitry 38 indicates that the inspection target 10 possesses a dangerous object (S42; Yes), the determination circuitry 50 determines whether or not the determination result of the determination circuitry 56 indicates that an electronic device is present in the predetermined range (S46).

When the determination result of the determination circuitry 56 indicates that an electronic device is present in the predetermined range (S46; Yes), there is a high possibility that the estimation circuitry 38 erroneously determines an electronic device possessed by the inspection target 10 as a dangerous object and estimates that the inspection target 10 possesses a dangerous object. Thus, the determination circuitry 50 determines that the inspection target 10 does not possess any dangerous object and causes the display device 58 to display the determination result or causes the warning device 60 to report the determination result (S44).

When the determination result of the determination circuitry 56 indicates that no electronic device is present in the predetermined range (S46; No), there is a high possibility that the estimation result of the estimation circuitry 38 is correct. Thus, the determination circuitry 50 determines that the inspection target 10 possesses a dangerous object and causes the display device 58 to display the determination result or causes the warning device 60 to report the determination result (S48).

Although not shown in FIG. 8, in a case where the estimation circuitry 38 estimates that the inspection target 10 possesses a plurality of dangerous objects, the determination circuitry 56 determines that one or more electronic devices are present in the predetermined range, and the estimated number of the dangerous objects is greater than the determined number of the electronic devices, the determination circuitry 50 may determine that the inspection target 10 possesses a dangerous object and may cause the display device 58 to display the determination result or cause the warning device 60 to report the determination result.

Although not shown in FIG. 8, in a facility, etc., which prohibits any carry-on electronic device, when the estimation result of the estimation circuitry 38 indicates that the inspection target 10 does not possess a dangerous object, and the determination result of the determination circuitry 56 indicates that an electronic device is present in the predetermined range, the determination circuitry 50 may determine that the inspection target 10 hides a prohibited carry-on object and may cause the display device 58 to display the determination result or cause the warning device 60 to report the determination result.

By these modifications, the operator of the inspection system recognizes that the secondary inspection is needed for the inspection target 10 and carries out the secondary inspection. For example, the secondary inspection is a contact inspection by an inspector or a re-inspection by an inspection system with higher accuracy.

The order of the determination of step S42 and the determination of step S44 may be the reverse order of FIG. 8.

According to the first embodiment, the inspection target 10 does not need to stop for inspection, and thus, the belongings can be efficiently inspected. Even if the primary device 62 estimates that the inspection target 10 possesses a dangerous object, when the secondary device 64 determines that an electronic device is present in the predetermined range, the estimation result of the primary device 62 is considered as a result of the erroneous recognition that the electronic device possessed by the inspection target 10 is a dangerous object. In this case, the determination circuitry 50 determines that the inspection target 10 does not possess any dangerous object. Thus, the inspection system determines that the secondary inspection is not needed, thereby preventing the decrease in the inspection efficiency.

Second Embodiment

A second embodiment is suitable for the inspection of a dangerous object which is present in shoes. The second embodiment relates to the modification of an antenna panel. The electric configuration of an inspection system according to the second embodiment is the same as the configuration of the first embodiment shown in FIG. 2. Thus, the illustration thereof is omitted.

Figure 9:
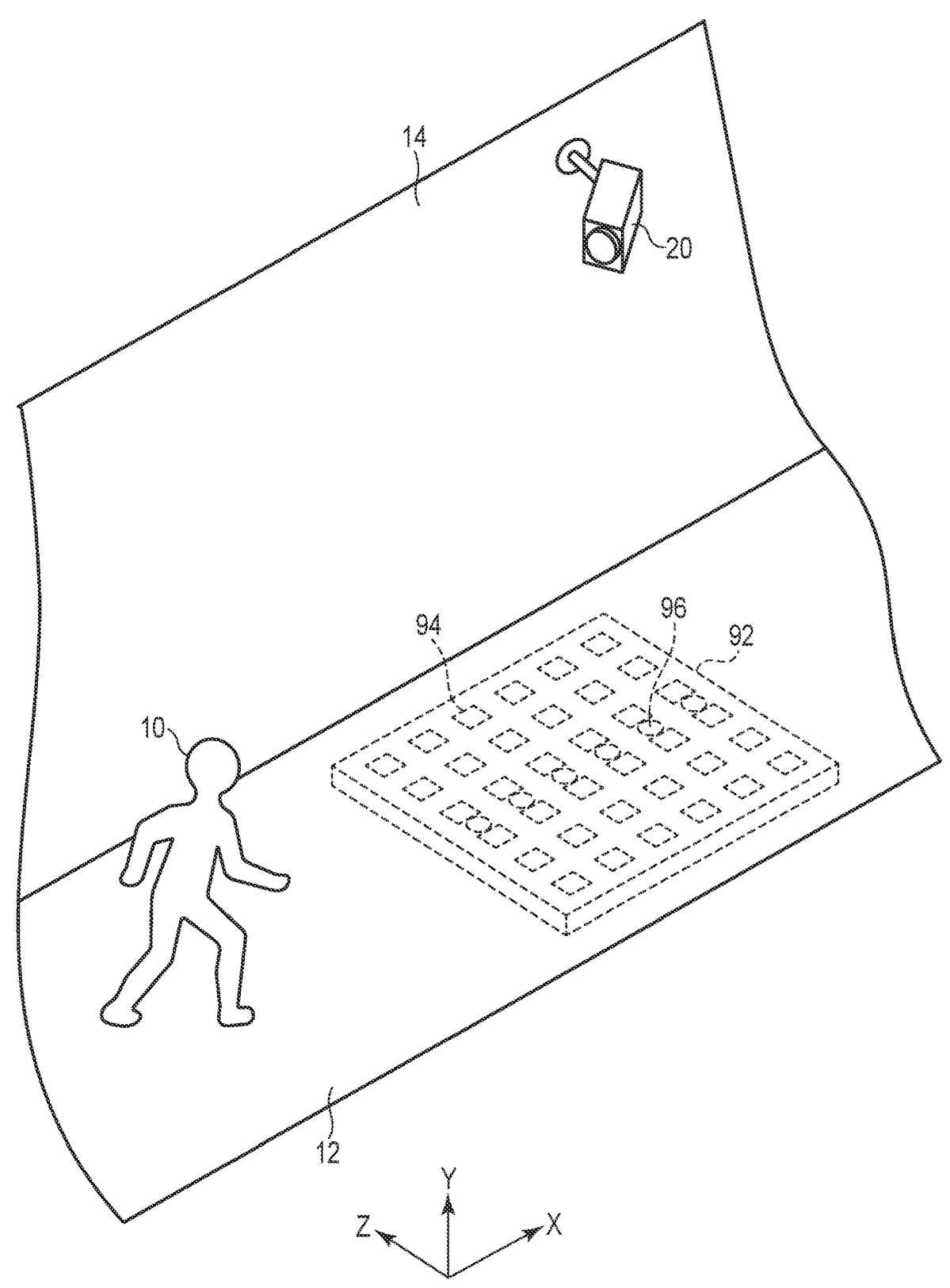
FIG. 9 is a diagram for explaining an example of an inspection system according to a second embodiment.

FIG. 9 is a diagram for explaining an example of an inspection system according to the second embodiment. An antenna panel 92 is provided in the floor of the passage 12.

The inspection area which is the capture range of the camera 20 is the area of an upper part of the antenna panel 92.

The antenna panel 92 includes a plurality of first antennas 94 and a plurality of second antennas 96. The first antennas 94 correspond to the first antennas 22 and 26 of the first embodiment. The first antennas 94 are connected to the primary device 62 shown in FIG. 2. The second antennas 96 correspond to the second antennas 24 and 28 of the first embodiment. The second antennas 96 are connected to the secondary device 64 shown in FIG. 2. The second antennas 24 and 28 are respectively provided in a two-dimensional array in the central portion of the antenna panels 16 and 18. However, the second antennas 96 are provided in a one-dimensional array in an X-axis direction parallel to the movement direction of an inspection target 10.

In addition to the effects of the first embodiment, the following effects are obtained from the second embodiment. In the second embodiment, the antenna panel 92 is provided at a position close to the feet of the inspection target 10. Thus, a dangerous object such as a knife hidden in shoes can be accurately detected. Further, the second embodiment prevents an erroneous determination caused by erroneously recognizing a sensor incorporated into shoes as a dangerous object, thereby preventing the decrease in the inspection efficiency.

The second embodiment can be combined with the first embodiment. In other words, an antenna panel may be provided at each of or one of the side walls and the floor of the passage 12. Further, four antenna panels may be provided at the both side walls, the floor, and the ceiling of the passage 12 such that the inspection target 10 is surrounded from the left, right, top and bottom sides in the four directions.

Third Embodiment

A third embodiment relates to the modification of an antenna panel. The electric configuration of an inspection system is substantially the same as the configuration of the first embodiment shown in FIG. 2. Thus, the illustration thereof is omitted.

The estimation circuitry 38 estimates whether or not the inspection target 10 possesses a dangerous object and estimates, based on the received signals of first antennas 22 and 26, the position of an object which can be estimated as a dangerous object in a Y-axis direction. The estimation circuitry 38 transmits an estimation result indicating whether or not the inspection target 10 possesses a dangerous object and an estimation result indicating the position of the dangerous object in the Y-axis direction to the determination circuitry 50.

Figure 10:
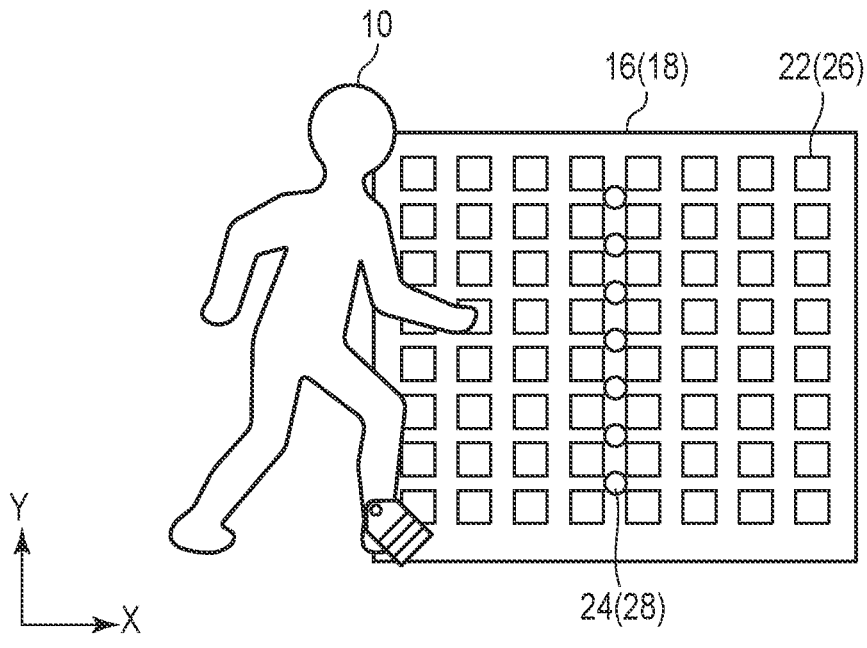
FIG. 10 is a diagram for explaining examples of an antenna panel according to a third embodiment.

FIG. 10 is a diagram for explaining an example of the antenna panels 16 and 18 of the inspection system according to the third embodiment. A plurality of the second antennas 24 and 28 are provided in a one-dimensional array in the Y-axis direction.

The determination circuitry 56 of the secondary device 64 connected to the antenna panels 16 and 18 determines whether or not an electronic device is present in the predetermined range and determines the position of an electronic device in the Y-axis direction based on the received signals of the second antennas 24 and 28. The determination circuitry 56 determines that the position of the second antennas 24 and 28 at the greatest level among the levels of the received signals of the second antennas 24 and 28 is the position of an electronic device in the Y-axis direction. The determination circuitry 56 transmits a determination result indicating whether or not an electronic device is present in the predetermined range and a determination result indicating the position of an electronic device in the Y-axis direction to the determination circuitry 50.

Figure 11:
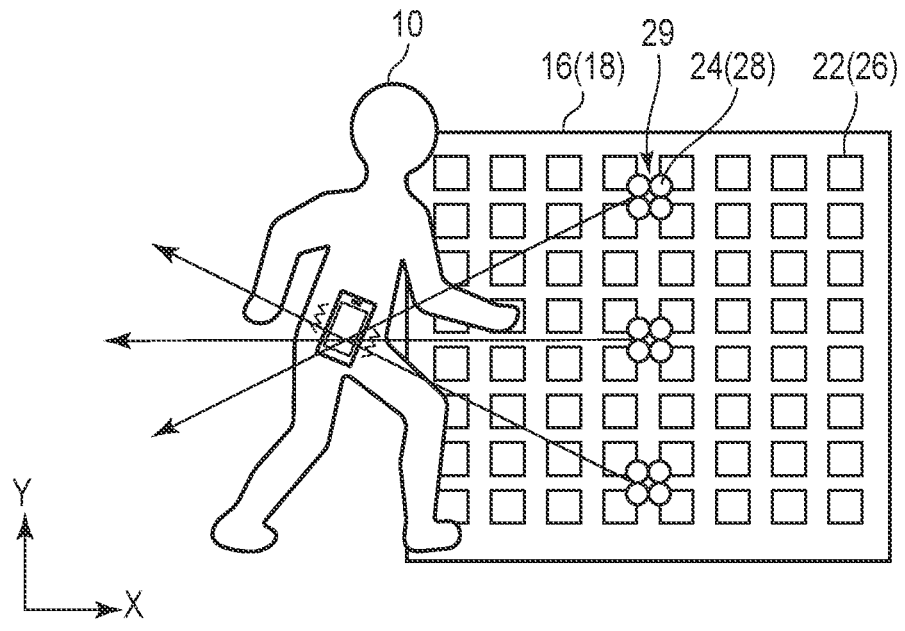
FIG. 11 is a diagram for explaining another example of the antenna panel according to the third embodiment.

FIG. 11 is a diagram for explaining another example of the antenna panels 16 and 18 of the inspection system according to the third embodiment. Four second antennas 24 and 28 constitute an array antenna 29. Three array antennas 29 are provided at different positions in the Y-axis direction.

The determination circuitry 56 of the secondary device connected to the antenna panels 16 and 18 determines whether or not an electronic device is present in the predetermined range and determines the position of an electronic device in the Y-axis direction based on the received signals of the array antennas 29. The determination circuitry 56 estimates the direction of arrival based on the received signals of three array antennas 29 and determines the position of an electronic device in the Y-axis direction. The determination circuitry 56 transmits a determination result indicating whether or not an electronic device is present in the predetermined range and a determination result indicating the position of an electronic device in the Y-axis direction to the determination circuitry 50.

Figure 12:
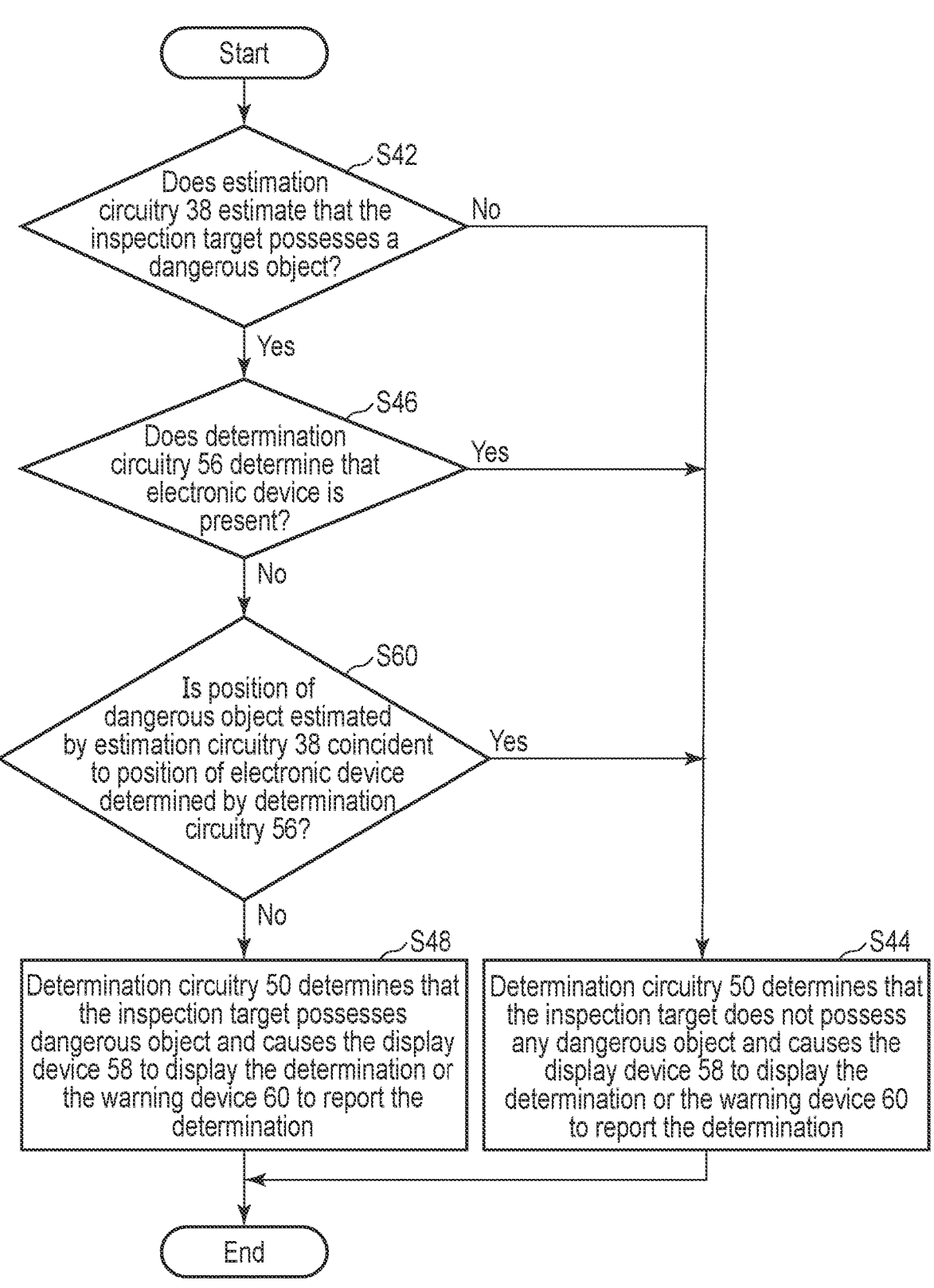
FIG. 12 is a flowchart showing an example of the flow of the determination process of a determination circuitry according to the third embodiment.

FIG. 12 is a flowchart showing an example of the flow of the determination process of the determination circuitry 50 of the inspection system according to the third embodiment.

In step S42, in a manner similar to that of the first embodiment, the determination circuitry 50 determines whether or not the estimation result of the estimation circuitry 38 indicates that the inspection target 10 possesses a dangerous object. When the estimation result of the estimation circuitry 38 indicates that the inspection target 10 does not possess any dangerous object (S42; No), in a manner similar to that of the first embodiment, the determination circuitry 50 determines that the inspection target 10 does not possess any dangerous object and causes the display device 58 to display the determination result or causes the warning device 60 to report the determination result (S44).

When the estimation result of the estimation circuitry 38 indicates that the inspection target 10 possesses a dangerous object (S42; Yes), in a manner similar to that of the first embodiment, the determination circuitry 50 determines whether or not the determination result of the determination circuitry 56 indicates that an electronic device is present in the predetermined range (S46). When the determination result of the determination circuitry 56 indicates that an electronic device is present in the predetermined range (S46; Yes), in a manner similar to that of the first embodiment, the determination circuitry 50 determines that the inspection target 10 does not possess any dangerous object and causes the display device 58 to display the determination result or causes the warning device 60 to report the determination result (S44).

When the determination result of the determination circuitry 56 indicates that no electronic device is present in the predetermined range (S46; No), the determination circuitry 50 determines whether or not the position in the Y-axis direction of a dangerous object estimated by the estimation circuitry 38 is coincident with the position in the Y-axis direction of an electronic device determined by the determination circuitry 56 (S60). When the position in the Y-axis direction of a dangerous object estimated by the estimation circuitry 38 is not coincident with the position in the Y-axis direction of an electronic device determined by the determination circuitry 56 (S60; No), there is a high possibility that the estimation result of the estimation circuitry 38 is correct. Thus, in a manner similar to that of the second embodiment, the determination circuitry 50 determines that the inspection target 10 possesses a dangerous object and causes the display device 58 to display the determination result or causes the warning device 60 to report the determination result (S48). By the operation of S48, the operator of the inspection system recognizes that the secondary inspection is needed for the inspection target 10 and carries out the secondary inspection.

When the position in the Y-axis direction of a dangerous object estimated by the estimation circuitry 38 is coincident with the position in the Y-axis direction of an electronic device determined by the determination circuitry 56 (S60; Yes), there is a high possibility that the estimation circuitry 38 estimates that the inspection target 10 possesses a dangerous object as a result of the erroneous determination that the electronic device possessed by the inspection target 10 is a dangerous object. Thus, the determination circuitry 50 determines that the inspection target 10 does not possess any dangerous object and causes the display device 58 to display the determination result or causes the warning device 60 to report the determination result (S44).

Although not shown in FIG. 12, in a case where the estimation circuitry 38 estimates that the inspection target 10 possesses dangerous objects at a plurality of positions, the determination circuitry 56 determines that one or more electronic devices are present at one or more positions in the predetermined range, and the estimated number of the dangerous objects is greater than the determined number of the electronic devices, the determination circuitry 50 may determine that the inspection target 10 possesses a dangerous object and may cause the display device 58 to display the determination result or cause the warning device 60 to report the determination result.

In addition to the effects of the first embodiment, the following effects are obtained from the third embodiment. In the third embodiment, only when the position of an electronic device is coincident with the position of a dangerous object, the estimation result indicating that the inspection target 10 possesses a dangerous object by the estimation circuitry 38 is changed to an estimation result indicating that the inspection target 10 does not possess any dangerous object. Thus, the possibility that an electronic device is erroneously determined as a dangerous object is decreased, thereby preventing the decrease in the inspection efficiency.

Fourth Embodiment

The secondary device 64 of each of the first to third embodiments is a passive device which receives the second electromagnetic wave transmitted from an electronic device. The first to third embodiments assume that an electronic device transmits a specific signal even when it is not connected to the Internet or is not on a call.

However, in some cases, there is a possibility that an electronic device does not transmit a specific signal when it is not connected to the Internet or is not on a call. The inspection system of a fourth embodiment includes a function of transmitting an electromagnetic wave to an electronic device in addition to the function of the inspection system of each of the first to third embodiments.

FIG. 13 is a block diagram for explaining an example of the inspection system according to the fourth embodiment. The secondary device 64 of the fourth embodiment includes an antenna 102 and a transmitter circuitry 104. The transmitter circuitry 104 operates based on a control signal from the controller 40. The transmitter circuitry 104 transmits a transmit request signal to an electronic device which is present in an inspection area via the antenna 102. The other configuration of the inspection system according to the fourth embodiment is the same as the configuration of the inspection system according to the first embodiment shown in FIG. 2.

Figure 14:
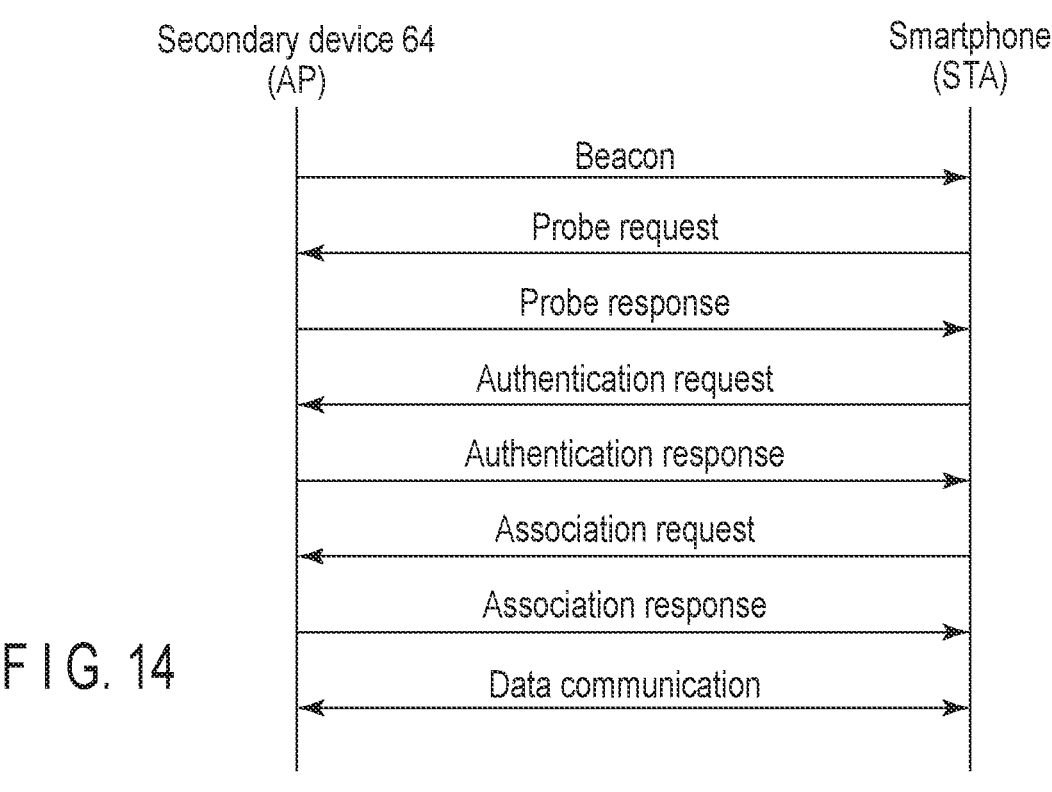
FIG. 14 shows an example of a communication start procedure between an access point and a station in Wi-Fi communication according to the fourth embodiment.

An example of a transmit request signal is explained. FIG. 14 shows an example of the communication start procedure between an access point (AP) and a station (STA) in Wi-Fi communication.

The AP transmits a beacon signal. The STA which receives the beacon signal transmits a probe request signal. The AP which receives the probe request signal transmits a probe response signal. The STA which receives the probe response signal transmits an authentication request signal. The AP which receives the authentication request signal transmits an authentication response signal. The STA which receives the authentication response signal transmits an association request signal. The AP which receives the association request signal transmits an association response signal. Subsequently, data communication is started between the AP and the STA.

The secondary device 64 functions as the AP of Wi-Fi communication. An electronic device functions as the STA. An example of the electronic device is a smartphone. The secondary device 64 (AP) periodically transmits the beacon signal to the inspection area. A smartphone (STA) which is present in the inspection area transmits the probe request signal when receiving the beacon signal in a case where a Wi-Fi function is turned on.

The secondary device 64 does not need to communicate with the smartphone. Thus, even if the secondary device 64 receives the probe request signal, the secondary device 64 does not transmit the probe response signal. Between the secondary device 64 and the smartphone, the authentication request/authentication response and the association request/association response in the Wi-Fi communication start procedure shown in FIG. 14 are not communicated, or data communication is not performed.

Even when an electronic device is not connected to the Internet or is not on a call, in a case where the Wi-Fi function is turned on, the electronic device transmits the probe request signal to the secondary device 64 when the electronic device receives the beacon signal transmitted from the secondary device 64. In this way, the secondary device 64 can receive the probe request signal transmitted from an electronic device in which the Wi-Fi function is turned on and which is not connected to the Internet or is not on a call as the second electromagnetic wave.

Figure 15:
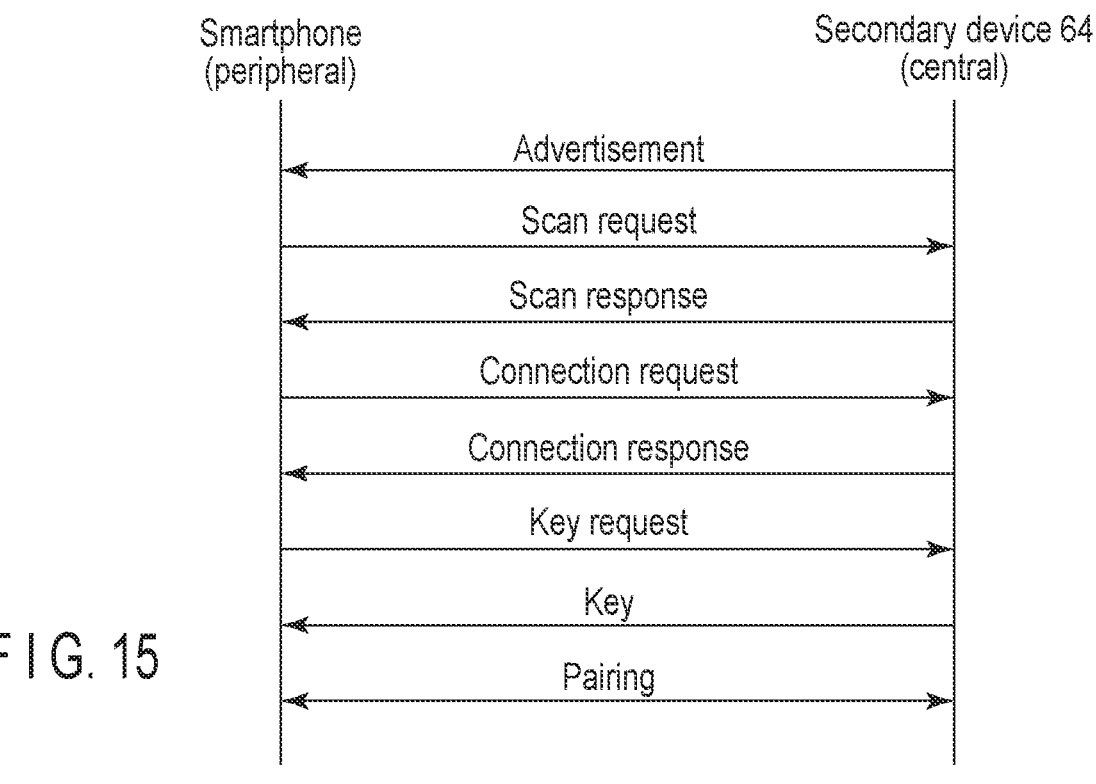
FIG. 15 shows an example of a communication start procedure between a central and a peripheral in BLE communication according to the fourth embodiment.

FIG. 15 shows an example of the communication start procedure between a central and a peripheral in BLE communication.

A central transmits an advertisement signal. FIG. 16 shows an example of the mode included in the advertisement signal. The mode is 2 bits of data indicating whether a peripheral is permitted to transmit a scan request (scannable) or not (non-scannable). When the mode indicates 00b and 01b, the transmitting of a scan request is not permitted. When the mode indicates 10b, the transmitting of a scan request is permitted. The mode of 11b is reserved for future use.

The peripheral which receives the advertisement signal transmits a scan request signal when the mode is 10b. The central which receives the scan request signal transmits a scan response signal. The peripheral which receives the scan response signal transmits a connection request signal. The central which receives the connection request signal transmits a connection response signal. The peripheral which receives the connection response signal transmits a key request signal. The central which receives the key request signal transmits a key signal. Subsequently, pairing is performed between the central and the peripheral, and data communication is started.

The secondary device 64 functions as the central of BLE communication. The smartphone functions as the peripheral. The secondary device 64 (central) periodically transmits the advertisement signal to the inspection area. The mode of the advertisement signal is set to 10b. The smartphone (peripheral) which is present in the inspection area transmits the scan request signal when the smartphone receives the advertisement signal in a case where the BLE function is turned on as the mode is 10b.

The secondary device 64 does not need to communicate with the smartphone. Thus, even if the secondary device 64 receives the scan request signal, the secondary device 64 does not transmit the scan response signal. Between the secondary device 64 and the smartphone, the connection request/connection response and the key request/key in the BLE communication start procedure shown in FIG. 15 are not communicated. Further, pairing or data communication is not performed.

Thus, even when an electronic device is not connected to the Internet or is not on a call, in a case where the BLE function is turned on, the electronic device transmits the scan request signal to the secondary device 64 when the electronic device receives the advertisement signal transmitted from the secondary device 64. In this way, the secondary device 64 can receive the scan request signal transmitted from an electronic device in which the BLE function is turned on and which is not connected to the Internet or is not on a call as the second electromagnetic wave.

In addition to the effects of the first embodiment, the following effects are obtained from the fourth embodiment. In the fourth embodiment, if the Wi-Fi function or the BLE function is turned on, an electronic device transmits the second electromagnetic wave even when it is not connected to the Internet or is not on a call. Thus, the inspection system can surely determine whether or not an electronic device is present in the predetermined range.

In the above explanation, the fourth embodiment is formed by modifying the first embodiment. However, the fourth embodiment may be formed by modifying the second embodiment or the third embodiment.

Fifth Embodiment

FIG. 17 is a block diagram showing an example of the electric configuration of an inspection system according to a fifth embodiment. The inspection system according to the fifth embodiment includes a database 112 and an automatic learning circuitry 114. The other configuration of the inspection system according to the fifth embodiment is the same as the configuration of the inspection system according to the fourth embodiment shown in FIG. 13.

The database 112 stores a large number of data sets each including the processing result of the signal processor 36, the estimation result of the estimation circuitry 38, and the determination result of the determination circuitry 56. For example, the database 112 stores a large number of sets each including an image signal indicating the reflection property of each point of the inspection target 10, an estimation result indicating whether or not the inspection target 10 possesses a dangerous object, and a determination result indicating whether or not an electronic device is present in the predetermined range.

When the estimation result of the estimation circuitry 38 indicates that the inspection target 10 possesses a dangerous object, and the determination result of the determination circuitry 56 indicates that an electronic device is present in the predetermined range, a determination circuitry 50 determines that the inspection target 10 does not possess any dangerous object. In other words, when the determination result of the determination circuitry 56 indicates that an electronic device is present in the predetermined range, the determination circuitry 50 determines that the estimation result indicating that the inspection target 10 possesses a dangerous object by the estimation circuitry 38 is incorrect, and substantially changes the estimation result indicating that the inspection target 10 possesses a dangerous object to a determination result indicating that the inspection target 10 does not possess any dangerous object. Thus, there is a possibility that the estimation of the estimation circuitry 38 is erroneous.

To reduce the number of erroneous estimations of the estimation circuitry 38, the automatic learning circuitry 114 causes the estimation circuitry 38 to learn so as to change an estimation result indicating that the inspection target 10 possesses a dangerous object to an estimation result indicating that the inspection target 10 does not possess any dangerous object when the determination result of the determination circuitry 56 indicates that an electronic device is present in the predetermined range.

If the estimation circuitry 38 includes the convolutional neural network, the automatic learning circuitry 114 changes coefficients of connections of the input layer and the pooling layer, coefficients of connections of the pooling layer and the fully-connected layer, and coefficients of connections of the fully-connected layer and the output layer. When the coefficients of the connections are changed, an estimation result for the same image signal is changed. The automatic learning circuitry 114 changes the coefficients of the connections of the convolutional neural network of the estimation circuitry 38 such that the estimation result for an image signal which is input to the estimation circuitry 38 when the determination circuitry 56 determines that an electronic device is present in the predetermined range indicates that the inspection target 10 does not possess any dangerous object.

In this way, the estimation circuitry 38 estimates that the inspection target 10 does not possess any dangerous object when an electronic device is present in the predetermined range. Thus, the estimation accuracy is improved.

In the above explanation, the fifth embodiment is formed by modifying the fourth embodiment. However, the fifth embodiment may be formed by modifying the first embodiment, the second embodiment, or the third embodiment.

MODIFIED EXAMPLES

In the embodiments, a real array antenna is explained as an antenna. However, instead of a real array antenna, a virtual array antenna may be used. An example of the virtual array antenna is a multiple-input and multiple-output (MIMO) array antenna.

The primary device 62 is not limited to a radar using an electromagnetic wave. When a dangerous object is a metal object, a metal detector may be used for the primary device 62. For example, the metal detector detects the change of the magnetic field by displacing a probe and detects metal based on the change of the magnetic field.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An inspection system comprising:
a first circuitry configured to estimate whether an inspection target possesses a predetermined object based on a received signal from a radar antenna;
an antenna device configured to receive a first electromagnetic wave from an electronic device present in a predetermined range;
a second circuitry configured to determine whether the electronic device is present in the predetermined range based on a received signal of the first electromagnetic wave received by the antenna device; and
a third circuitry configured to determine whether the inspection target possesses the predetermined object based on an estimation result of the first circuitry and a determination result of the second circuitry,
wherein:
an electromagnetic wave receiving range of the antenna device includes the predetermined range,
the radar antenna and the antenna device are provided on an antenna panel,
an electromagnetic wave transmitting-and-receiving area of the antenna panel corresponds to the predetermined range, and
the predetermined object is different from the electronic device.

2. The inspection system of claim 1, wherein the third circuitry is configured to determine that the inspection target does not possess the predetermined object when the first circuitry estimates that the inspection target possesses the predetermined object and the second circuitry determines that the electronic device is present in the predetermined range.

3. The inspection system of claim 1, wherein;
the first circuitry is configured to estimate a position of the predetermined object;
the second circuitry is configured to determine a position of the electronic device; and
the third circuitry is configured to determine that the inspection target does not possess the predetermined object when the first circuitry estimates that the inspection target possesses the predetermined object, the second circuitry determines that the electronic device is present in the predetermined range, and the position of the predetermined object estimated by the first circuitry is coincident with the position of the electronic device determined by the second circuitry.

4. The inspection system of claim 1, wherein the third circuitry is configured to determine that the inspection target possesses the predetermined object when the first circuitry estimates that the inspection target possesses the predetermined object and the second circuitry determines that the electronic device is not present in the predetermined range.

5. The inspection system of claim 1, wherein:

the first circuitry is configured to estimate a position of the predetermined object;

the second circuitry is configured to determine a position of the electronic device; and the third circuitry is configured to determine that the inspection target possesses the predetermined object when the first circuitry estimates that the inspection target possesses the predetermined object, the second circuitry determines that the electronic device is present in the predetermined range, and the position of the predetermined object estimated by the first circuitry is not coincident with the position of the electronic device determined by the second circuitry.

6. The inspection system of claim 1, wherein the first circuitry comprises a circuitry provided in a radar which transmits a second electromagnetic wave to the inspection target and receives the second electromagnetic wave reflected by the inspection target.

7. The inspection system of claim 1, wherein the second circuitry is configured to analyze the received signal of the first electromagnetic wave received by the antenna device by a spectrum analysis or a sniffer analysis and determine whether the electronic device is present in the predetermined range based on an analysis result.

8. The inspection system of claim 1, wherein the first electromagnetic wave comprises an electromagnetic wave for transmitting data, sound, channel sounding, beacon, or device discovery.

9. The inspection system of claim 1, further comprising a fourth circuitry configured to transmit a request signal for causing the electronic device to transmit the first electromagnetic wave, wherein the request signal comprises a beacon signal for causing the electronic device to transmit a probe request signal, or an advertisement signal for causing the electronic device to transmit a scan request signal.

10. The inspection system of claim 1, wherein;

the radar antenna is configured to transmit a second electromagnetic wave to the inspection target and receive the second electromagnetic wave reflected by the inspection target, and the inspection system further comprises:

a storage configured to store a plurality of data sets each including a received signal of the second electromagnetic wave received by the radar antenna, the estimation result of the first circuitry, and the determination result of the second circuitry; and a fifth circuitry configured to change the estimation result output from the first circuitry based on the data sets stored in the storage.

11. The inspection system of claim 1, wherein:

the antenna device comprises antennas arranged in a two-dimensional array, antennas arranged in a one-dimensional array or array antennas arranged in a two-dimensional array, and each of the array antennas comprises a plurality of antennas.

12. The inspection system of claim 1, wherein the predetermined object comprises a metal object and powder.

13. The inspection system of claim 1, wherein the electronic device comprises a personal computer, a smartphone, a mobile phone, a mobile game console, a wristwatch with a built-in sensor, clothes with a built-in sensor, and a shoe with a built-in sensor.

14. The inspection system of claim 1, wherein:

the antenna device comprises antennas, and positions of the antennas in a vertical direction are different from each other.

15. The inspection system of claim 14, wherein:

the second circuitry is configured to determine a position of the electronic device in the vertical direction based on levels of received signals of the antennas, and the third circuitry is configured to determine whether the inspection target possesses the predetermined object based on the estimation result of the first circuitry, the determination result of the second circuitry, and the position of the electronic device determined by the second circuitry.

16. The inspection system of claim 1, wherein the first circuitry is configured to irradiate the first electromagnetic wave to the predetermined range by using the radar antenna, receive a reflected wave of the first electromagnetic wave from the inspection target, and estimate whether the inspection target possesses the predetermined object based on a level of the reflected wave.

* * * * *